(12) United States Patent
Yu et al.

(10) Patent No.: US 10,911,970 B2
(45) Date of Patent: Feb. 2, 2021

(54) METHOD AND APPARATUS FOR DETECTING TIME SERIES DATA

(71) Applicant: HUAWEI TECHNOLOGIES CO., LTD., Guangdong (CN)

(72) Inventors: Qi Yu, Beijing (CN); Yanping Jiang, Shenzhen (CN); Mitch Tseng, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/023,490

(22) Filed: Jun. 29, 2018

(65) Prior Publication Data

US 2018/0310196 A1 Oct. 25, 2018

Related U.S. Application Data

(63) Continuation of application No. PCT/CN2016/112486, filed on Dec. 27, 2016.

(30) Foreign Application Priority Data

Dec. 31, 2015 (CN) .......................... 2015 1 1031852

(51) Int. Cl.
*H04W 24/10* (2009.01)
*H04W 4/00* (2018.01)
*H04W 4/70* (2018.01)

(52) U.S. Cl.
CPC ............. *H04W 24/10* (2013.01); *H04W 4/00* (2013.01); *H04W 4/70* (2018.02)

(58) Field of Classification Search
CPC ............................ H04W 48/10; H04W 48/18
See application file for complete search history.

(56) References Cited

U.S. PATENT DOCUMENTS 10,034,023 B1\* 7/2018 Paniconi ................ H04N 19/65
2001/0032325 A1\* 10/2001 Fong ....................... G06F 11/14
(Continued)

FOREIGN PATENT DOCUMENTS

| CN | 1701566 A | 11/2005 |
| CN | 102495851 A | 6/2012 |

(Continued)

OTHER PUBLICATIONS

Extended European Search Report issued in European Application No. 16881189.1 dated Sep. 13, 2018, 7 pages.
(Continued)

*Primary Examiner* — Ronald B Abelson
(74) *Attorney, Agent, or Firm* — Fish & Richardson P.C.

(57) ABSTRACT

Embodiments of the present invention relate to data detection technologies, and in particular, to a method and an apparatus for detecting time series data. A method for detecting time series data is disclosed. The method is applied to a data transmission system and includes: determining, based on data information carried in time series data from a data source device, whether missing of time series data occurs in a data receiving process, where the data information includes time information and/or sequence numbers; if missing of time series data occurs, storing data information of the missing time series data; determining whether a preset trigger condition for a data missing notification is currently satisfied; and if the trigger condition for a data missing notification is satisfied, sending data missing notification information to a target device.

24 Claims, 12 Drawing Sheets

(56) References Cited

U.S. PATENT DOCUMENTS

| | | | |
|---|---|---|---|
| 2006/0025124 A1 | 2/2006 | Matsumoto | |
| 2006/0056421 A1* | 3/2006 | Zaki | H04L 12/56 |
| 2006/0187955 A1* | 8/2006 | Rezaiifar | H04J 15/00 |
| 2008/0320356 A1* | 12/2008 | Tokita | H04L 1/18 |
| 2013/0223365 A1* | 8/2013 | Choi | H04W 72/12 |
| 2013/0226613 A1 | 8/2013 | Srinivasan et al. | |
| 2013/0262013 A1 | 10/2013 | Ide | |
| 2016/0044527 A1* | 2/2016 | Long | H04W 28/02 |

FOREIGN PATENT DOCUMENTS

| | | |
|---|---|---|
| CN | 103368787 A | 10/2013 |
| CN | 103605805 A | 2/2014 |
| CN | 104750830 A | 7/2015 |
| CN | 104782078 A | 7/2015 |
| WO | 2013169183 A1 | 11/2013 |
| WO | 2014194616 A1 | 12/2014 |
| WO | 2015046960 A1 | 4/2015 |
| WO | 2015118914 A1 | 8/2015 |

OTHER PUBLICATIONS

International Search Report issued in International Application No. PCT/CN2016/112486 dated Mar. 23, 2017, 13 pages.
EPO Communication pursuant to Article 94(3) EPC issued in European Application No. 16881189.1 dated Oct. 13, 2020, 5 pages.
Office Action issued in Chinese Application No. 201511031852.8 dated Nov. 18, 2020, 8 pages.

\* cited by examiner

METHOD AND APPARATUS FOR DETECTING TIME SERIES DATA

CROSS-REFERENCE TO RELATED APPLICATIONS

This application is a continuation of International Application No. PCT/CN2016/112486, filed on Dec. 27, 2016, which claims priority to Chinese Patent Application No. 201511031852.8, filed on Dec. 31, 2015, The disclosures of the aforementioned applications are hereby incorporated by reference in their entireties.

TECHNICAL FIELD

Embodiments of the present invention relate to data detection technologies, and in particular, to a method and an apparatus for detecting time series data.

BACKGROUND

M2M (Machine to Machine, machine to machine) is an algorithm model of a conversation between terminals. There is a relatively special data type: time series data (or referred to as time sequence data) in M2M application. The time series data has a temporal order and is dynamic, infinite, and unpredictable.

In the prior art, time series data is stored and transmitted based on a oneM2M model. In the oneM2M model, a data attribute of the time series data is described by using a time series resource and a time series instance resource.

In the foregoing oneM2M model, the time series data is received and stored based on attribute descriptions of the time series resource and the time series instance resource. However, missing of data inevitably occurs in a data receiving process. Therefore, how to detect and report, in the M2M model, missing time series data is an urgent problem that needs to be resolved.

SUMMARY

Embodiments of the present invention provide a method and an apparatus for detecting time series data, and a device, to implement, in an M2M data transmission system, detection and reporting of missing time series data.

According to a first aspect, an embodiment of the present invention provides a method for detecting time series data. The method is applied to a data transmission system and includes:

determining, based on data information carried in time series data from a data source device, whether missing of time series data occurs in a data receiving process, where the data information includes time information and/or sequence numbers;

if missing of time series data occurs, storing data information of the missing time series data;

determining whether a preset trigger condition for a data missing notification is currently satisfied; and if the trigger condition for a data missing notification is satisfied, sending data missing notification information to a target device.

Optionally, before the determining, based on data information carried in time series data from a data source device, whether missing of time series data occurs in a data receiving process, the method further includes:

determining whether a value of a missing data detection parameter in a time series resource created in advance is true; and if the value is true, determining, based on the data information carried in the time series data from the data source device, whether missing of time series data occurs in the data receiving process.

Optionally, before the determining, based on data information carried in time series data from a data source device, whether missing of time series data occurs in a data receiving process, the method further includes:

creating a time series resource based on a first request message that is from the data source device and that is used to request to create a time series resource, where the first request message carries the following parameters: a maximum quantity of missing data, a current quantity of missing data, and a missing data list; and the time series resource includes: an attribute of the maximum quantity of missing data, an attribute of the current quantity of missing data, and a missing data list attribute that are respectively created based on the maximum quantity of missing data, the current quantity of missing data, and the missing data list; and the attribute of the maximum quantity of missing data is used to record a maximum quantity of missing time series data, the attribute of the current quantity of missing data is used to record a current quantity of missing time series data, and the missing data list is used to record time information and/or a sequence number of time series data that is already missing.

Optionally, the parameters carried in the first request message further include a maximum waiting time; and the time series resource further includes a maximum waiting time attribute that is created based on the maximum waiting time, where the maximum waiting time attribute is used to identify a maximum waiting time taken to determine time series data that has not been received as missing time series data.

Optionally, the parameters carried in the first request message further include a trigger parameter of a time series data missing notification;

the time series resource further includes a subscription resource, and the subscription resource includes a missing data subscription event that is set based on the trigger parameter of a time series data missing notification; and the missing data subscription event includes the trigger condition for a data missing notification that is set based on the trigger parameter of a time series data missing notification.

Optionally, the method further includes:

creating a subscription resource based on a second request message that is from the data source device and that is used to request to create a subscription resource, where the subscription resource is a child resource of the time series resource, and the second request message carries a trigger parameter of a time series data missing notification;

the subscription resource includes a missing data subscription event that is set based on the trigger parameter of a time series data missing notification; and the missing data subscription event includes the trigger condition for a data missing notification that is set based on the trigger parameter of a time series data missing notification.

Optionally, the determining, based on time information carried in time series data from a data source device, whether missing of time series data occurs in a data receiving process includes:

receiving periodic time series data from the data source device; and determining, based on a time period carried in the received periodic time series data or consecutiveness of a sequence number corresponding to the time period, whether missing of time series data occurs in the data receiving process.

Optionally, the determining, based on a time period carried in the received periodic time series data or consecutiveness of a sequence number corresponding to the time period, whether missing of time series data occurs in the data receiving process includes:

determining, based on the time period carried in the received periodic time series data or the consecutiveness of the sequence number corresponding to the time period, whether there is time series data that has not been received;

if there is time series data that has not been received, determining, after waiting for preset duration, whether there is still time series data that has not been received; and if there is still time series data that has not been received, determine the time series data that still has not been received after the preset duration as time series data that is already missing.

Optionally, before the determining whether a preset trigger condition for a data missing notification is currently satisfied, the method further includes:

determining whether a missing data subscription event is set in a subscription resource created in advance; and if the missing data subscription event exists, determining whether the trigger condition for a data missing notification that is preset in the missing data subscription event is currently satisfied.

Optionally, the trigger condition for a data missing notification includes:

whether a current time reaches a report time predetermined in a preset missing data report period; and/or whether a current quantity of time series data that is already missing reaches a preset report quantity.

According to a second aspect, an embodiment of the present invention provides a method for detecting time series data. The method is applied to a data transmission system and includes:

generating time series data based on data information of data to be sent, where the time series data carries the data information, and the data information includes time information and/or sequence numbers; and sending the time series data to a data receiving device, so that the data receiving device determines, based on the time information and/or the sequence numbers carried in received time series data, whether missing of time series data occurs in a data receiving process, and if missing of time series data occurs, stores data information of the missing time series data; and the data receiving device further determines whether a preset trigger condition for a data missing notification is currently satisfied, and if the trigger condition for a data missing notification is satisfied, sends data missing notification information to a target device.

Optionally, before the sending the time series data to a data receiving device, the method further includes:

sending, to the data receiving device, a first request message for requesting the data receiving device to create a time series resource, where the first request message carries the following parameters: a maximum quantity of missing data, a current quantity of missing data, and a missing data list, so that the data receiving device respectively creates an attribute of the maximum quantity of missing data, an attribute of the current quantity of missing data, and a missing data list attribute in the time series resource based on the maximum quantity of missing data, the current quantity of missing data, and the missing data list; and the attribute of the maximum quantity of missing data is used to record a maximum quantity of missing time series data, the attribute of the current quantity of missing data is used to record a current quantity of missing time series data, and the missing data list is used to record time information and/or a sequence number of time series data that is already missing.

Optionally, the parameters carried in the first request message further include a maximum waiting time, so that the data receiving device creates a maximum waiting time attribute in the time series resource based on the maximum waiting time, where the maximum waiting time attribute is used by the data receiving device to identify a maximum waiting time taken to determine time series data that has not been received as missing time series data.

Optionally, the parameters carried in the first request message further include a trigger parameter of a time series data missing notification, so that the data receiving device sets a missing data subscription event in a subscription resource of the time series resource based on the trigger parameter of a time series data missing notification, and the missing data subscription event includes the trigger condition for a data missing notification that is set based on the trigger parameter of a time series data missing notification.

Optionally, the method further includes:

sending, to the data receiving device, a second request message for requesting the data receiving device to create a subscription resource, where the second request message carries a trigger parameter of a time series data missing notification, so that the data receiving device sets a missing data subscription event in the created subscription resource based on the trigger parameter of a time series data missing notification, and the missing data subscription event includes the trigger condition for a data missing notification that is set based on the trigger parameter of a time series data missing notification.

According to a third aspect, an embodiment of the present invention provides an apparatus for detecting time series data. The apparatus is applied to a data transmission system and includes:

a first determining module, configured to determine, based on data information carried in time series data from a data source device, whether missing of time series data occurs in a data receiving process, where the data information includes time information and/or sequence numbers;

a storage module, configured to: if missing of time series data occurs, store data information of the missing time series data;

a second determining module, configured to determine whether a preset trigger condition for a data missing notification is currently satisfied; and a notification message sending module, configured to: if the trigger condition for a data missing notification is satisfied, send data missing notification information to a target device.

Optionally, the first determining module is further configured to:

before determining, based on the data information carried in the time series data from the data source device, whether missing of time series data occurs in the data receiving process, determine whether a value of a missing data detection parameter in a time series resource created in advance is true; and if the value is true, determine, based on the data information carried in the time series data from the data source device, whether missing of time series data occurs in the data receiving process.

Optionally, the apparatus further includes a time series resource creation module, configured to: before whether missing of time series data occurs in the data receiving process is determined based on the data information carried in the time series data from the data source device, create a time series resource based on a first request message that is from the data source device and that is used to request to create a time series resource, where the first request message carries the following parameters: a maximum quantity of missing data, a current quantity of missing data, and a missing data list; and the time series resource includes: an attribute of the maximum quantity of missing data, an attribute of the current quantity of missing data, and a missing data list attribute that are respectively created based on the maximum quantity of missing data, the current quantity of missing data, and the missing data list; and the attribute of the maximum quantity of missing data is used to record a maximum quantity of missing time series data, the attribute of the current quantity of missing data is used to record a current quantity of missing time series data, and the missing data list is used to record time information and/or a sequence number of time series data that is already missing.

Optionally, the parameters carried in the first request message further include a maximum waiting time; and the time series resource further includes a maximum waiting time attribute that is created based on the maximum waiting time, where the maximum waiting time attribute is used to identify a maximum waiting time taken to determine time series data that has not been received as missing time series data.

Optionally, the parameters carried in the first request message further include a trigger parameter of a time series data missing notification;

the time series resource further includes a subscription resource, and the subscription resource includes a missing data subscription event that is set based on the trigger parameter of a time series data missing notification; and the missing data subscription event includes the trigger condition for a data missing notification that is set based on the trigger parameter of a time series data missing notification.

Optionally, the apparatus further includes:

a subscription resource creation module, configured to create a subscription resource based on a second request message that is from the data source device and that is used to request to create a subscription resource, where the subscription resource is a child resource of the time series resource, and the second request message carries a trigger parameter of a time series data missing notification;

the subscription resource includes a missing data subscription event that is set based on the trigger parameter of a time series data missing notification; and the missing data subscription event includes the trigger condition for a data missing notification that is set based on the trigger parameter of a time series data missing notification.

Optionally, the first determining module is specifically configured to:

receive periodic time series data from the data source device; and determine, based on a time period carried in the received periodic time series data or consecutiveness of a sequence number corresponding to the time period, whether missing of time series data occurs in the data receiving process.

Optionally, the first determining module is specifically configured to:

determine, based on the time period carried in the received periodic time series data or the consecutiveness of the sequence number corresponding to the time period, whether there is time series data that has not been received;

if there is time series data that has not been received, determine, after waiting for preset duration, whether there is still time series data that has not been received; and if there is still time series data that has not been received, determine the time series data that still has not been received after the preset duration as time series data that is already missing.

Optionally, the second determining module is further configured to: determine whether a missing data subscription event is set in a subscription resource created in advance; and if the missing data subscription event exists, determine whether the trigger condition for a data missing notification that is preset in the missing data subscription event is currently satisfied.

Optionally, the trigger condition for a data missing notification includes:

whether a current time reaches a report time predetermined in a preset missing data report period; and/or whether a current quantity of time series data that is already missing reaches a preset report quantity.

According to a fourth aspect, an embodiment of the present invention provides an apparatus for detecting time series data. The apparatus is applied to a data transmission system and includes:

a time series data generation module, configured to generate time series data based on data information of data to be sent, where the time series data carries the data information, and the data information includes time information and/or sequence numbers; and a first sending module, configured to send the time series data to a data receiving device, so that the data receiving device determines, based on the time information and/or the sequence numbers carried in received time series data, whether missing of time series data occurs in a data receiving process, and if missing of time series data occurs, stores data information of the missing time series data; and the data receiving device further determines whether a preset trigger condition for a data missing notification is currently satisfied, and if the trigger condition for a data missing notification is satisfied, sends data missing notification information to a target device.

Optionally, the sending module is further configured to: before sending the time series data to the data receiving device, send, to the data receiving device, a first request message for requesting the data receiving device to create a time series resource, where the first request message carries the following parameters: a maximum quantity of missing data, a current quantity of missing data, and a missing data list, so that the data receiving device respectively creates an attribute of the maximum quantity of missing data, an attribute of the current quantity of missing data, and a missing data list attribute in the time series resource based on the maximum quantity of missing data, the current quantity of missing data, and the missing data list; and the attribute of the maximum quantity of missing data is used to record a maximum quantity of missing time series data, the attribute of the current quantity of missing data is used to record a current quantity of missing time series data, and the missing data list is used to record time information and/or a sequence number of time series data that is already missing.

Optionally, the parameters carried in the first request message further include a maximum waiting time, so that the data receiving device creates a maximum waiting time attribute in the time series resource based on the maximum waiting time, where the maximum waiting time attribute is used by the data receiving device to identify a maximum waiting time taken to determine time series data that has not been received as missing time series data.

Optionally, the parameters carried in the first request message further include a trigger parameter of a time series data missing notification, so that the data receiving device sets a missing data subscription event in a subscription resource of the time series resource based on the trigger parameter of a time series data missing notification, and the missing data subscription event includes the trigger condition for a data missing notification that is set based on the trigger parameter of a time series data missing notification.

Optionally, the apparatus further includes: a second sending module, configured to send, to the data receiving device, a second request message for requesting the data receiving device to create a subscription resource, where the second request message carries a trigger parameter of a time series data missing notification, so that the data receiving device sets a missing data subscription event in the created subscription resource based on the trigger parameter of a time series data missing notification, and the missing data subscription event includes the trigger condition for a data missing notification that is set based on the trigger parameter of a time series data missing notification.

According to the method for detecting time series data in the embodiments of the present invention, the data receiving device determines, based on the data information of the time series data that is already received, whether missing of time series data of data information occurs in the data receiving process, and reports information about the missing time series data to the target device when the trigger condition for a data missing notification is satisfied, so as to implement, in the data transmission system, detection and reporting of the missing time series data.

BRIEF DESCRIPTION OF DRAWINGS

To describe the technical solutions in the embodiments of the present invention, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
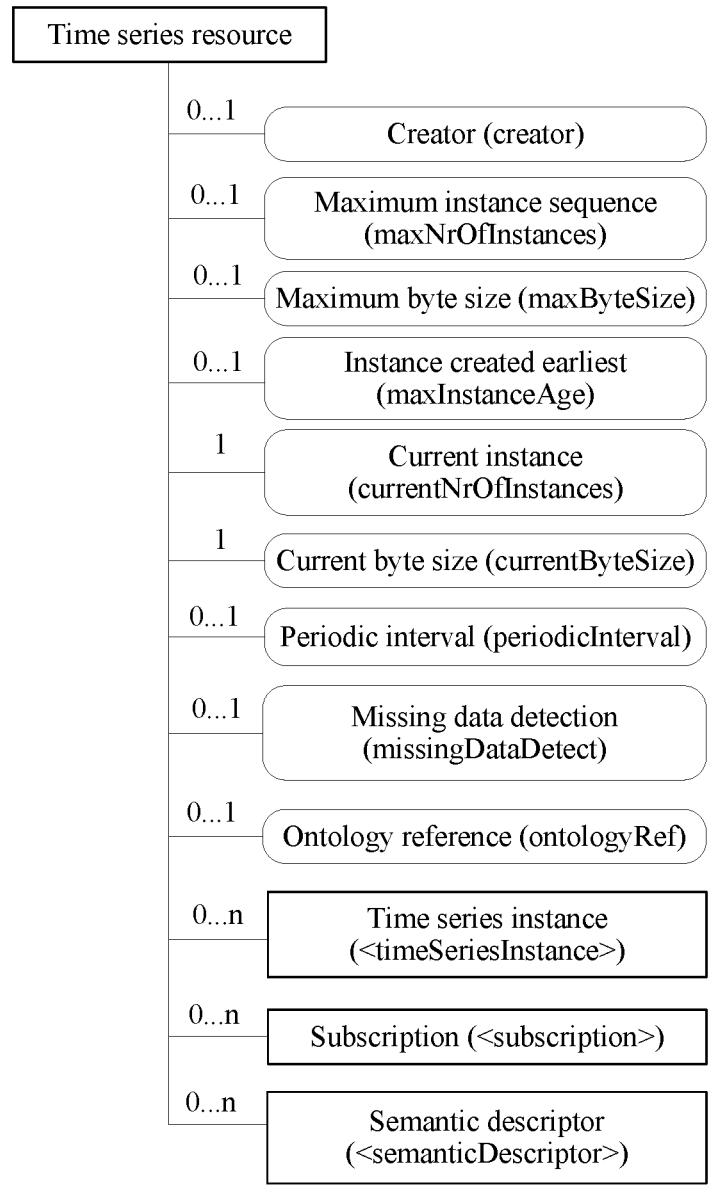
FIG. 1 is a schematic representation diagram of specified attributes in a time series resource.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In the accompanying drawings and tables in the embodiments of the present invention:

"1" indicates that an attribute or a child resource exists and is unique;

"0 . . . 1" indicates that an attribute or a child resource may not exist, and needs to be unique if the attribute or the child resource exists;

"0 . . . n" indicates that an attribute or a child resource may not exist, and there may be a plurality of attributes or child resources if the attribute or the child resource exists;

"1 . . . n" indicates that at least one child resource exists; and

"L" indicates that attribute values of an attribute are a list including one or more pieces of data.

Time series data in M2M application may be divided, based on different trigger types, into periodic time series data and event-triggered time series data.

For example, a vehicle service application is provided with a vehicle traveling track playback function. The function requires a vehicle to periodically send position information of the vehicle to a data storage center (such as a cloud) in a period of 30 seconds. The sent position information may include information such as a time, a longitude, a latitude, or a speed. In this example, time series data is periodically sent by a vehicle terminal, and data sent each time varies. In addition, when time and space are available, the vehicle terminal may keep sending position information to the data storage center.

For another example, for a smart household, when detecting that smoke concentration in air reaches a predetermined threshold, a smoke alarm sends an alarm and sends such event information to an M2M data storage center. The specific reported event information may include information such as a time when an event occurs or a number or a position of a triggered sensor. Different from the previous example in which the position information of the vehicle is periodically sent, in this example, the event information sent by the smoke alarm is generated by triggering a particular event, and time series data of this type is random and unpredictable. Therefore, generated time series data is also unpredictable.

It may be learned from the foregoing two examples that, time series data with time information is different from conventional data, and the time information is one of obvious characteristics that differentiate the time series data from other conventional data. The time information describes a many-to-one or one-to-one mapping relationship between data in a data stream and an event. The time information not only reflects a sequential relationship between data elements and a distribution status of the data elements in time domain, but also includes significant semantic information in description of a time series data operation. The time series data not only reflects a state of an object in a moment, but also reflects an entire status of the object in the past, or may even be used to predict a future development trend of a data object by various means or methods.

A oneM2M standard is a standard that combines M2M communication and Thing of Internet (Thing of Internet) communication. In the existing oneM2M standard, data is described by using two resources: a time series (<timeSeries>) resource and a time series instance (<timeSeriesInstance>) resource. The time series instance resource is a child resource of the time series resource. Time series data may be stored by using the two resources.

The oneM2M standard includes a common attribute (common attribute), a universal attribute (universal attribute), and a specified attribute (specified attribute). The specified attribute exists only in the time series resource and the time series instance resource.

FIG. 1 is a schematic representation diagram of specified attributes in a time series resource.

Figure 2:
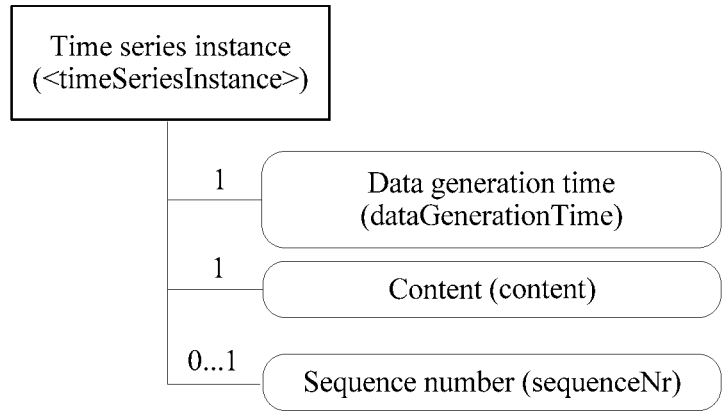
FIG. 2 is a schematic representation diagram of specified attributes in a time series instance resource.

FIG. 2 is a schematic representation diagram of specified attributes in a time series instance resource.

As shown in FIG. 1, the time series resource further includes a subscription (<subscription>) resource. The subscription resource is a child resource of the time series resource. The subscription resource includes attributes such as event notification criteria (eventNotificationCriteria) and a notification content type (notificationContentType). A data source device or another attribute, that is, another resource, that needs to obtain a related notification message may subscribe to related notification information by using the subscription resource. Specifically, a trigger condition for an event notification may be set in the event notification criteria (eventNotificationCriteria).

In a oneM2M resource model shown in FIG. 1 and FIG. 2, the time series instance resource is a child resource of the time series resource, a data object is stored in a content (content) attribute of the time series instance resource, and a data generation time (dataGenerationTime) attribute stores a generation time of the data object stored in the content attribute.

The oneM2M standard shown in FIG. 1 and FIG. 2 implement collection and storage of time series data, but how to detect and report missing time series data is still an urgent technical problem that needs to be resolved.

Figure 3:
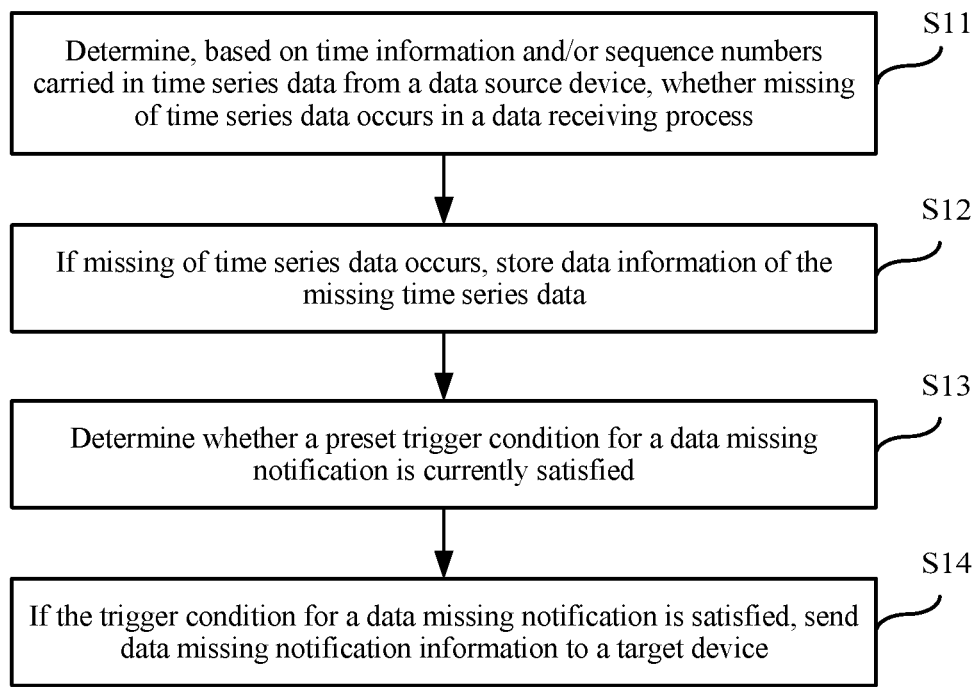
FIG. 3 is a flowchart of a method for detecting time series data according to Embodiment 1 of the present invention.

FIG. 3 is a flowchart of a method for detecting time series data according to Embodiment 1 of the present invention. The method for detecting time series data shown in FIG. 3 is applied to an M2M data transmission system, to implement detection and reporting of missing of time series data in the M2M data transmission system. The method for detecting time series data in this embodiment is performed by a data receiving device. The data receiving device may be implemented as an AE (application entity, application entity), a CSE (common services entity, common services entity), and the like. Specifically, for example, the data receiving device may be a storage cloud. As shown in FIG. 3, the method in this embodiment may include the following processing steps.

Step S11: Determine, based on time information and/or sequence numbers carried in time series data from a data source device, whether missing of time series data occurs in a data receiving process.

In this embodiment of the present invention, the data source device sends generated time series data to the data receiving device. The data receiving device determines whether a value of a missing data detection (missingDataDetect) parameter in a time series resource generated in advance is true. For example, when the parameter is true or 1, it is determined that the value of the missing data detection parameter is true.

When the value of the missing data detection parameter is true, the data receiving device may determine, based on the data information of the time series data, whether missing of data occurs in the data receiving process. For example, the time series data that is sent by the data source device to the data receiving device is periodic time series data, and the data receiving device may determine, based on periodicity of the time series data, whether data missing occurs. For example, periodic time series data received by the data receiving device includes t1, t2, t4, and t5, where 1, 2, 4, and 5 in t1, t2, t4, and t5 may each indicate a generation time or a sending time of the time series data or a number corresponding to a corresponding time, and a time interval between adjacent times or adjacent numbers is a period. The data receiving device determines, based on numbers or times in the received time series data, whether data missing occurs. In the example, t3 is missing. The data receiving device may determine that t3 is missing in the data receiving process.

For event-triggered time series data, the data source device may number a plurality of pieces of continuously generated event time series data based on a trigger time. The data receiving device may determine, based on numbers of received event time series data, whether missing of time series data occurs.

Step S12: If missing of time series data occurs, store data information of the missing time series data.

When determining that missing of data occurs in the data receiving process, the data receiving device stores data information of the missing time series data, such as generation time information or sequence number information of the missing time series data. Specifically, the data receiving device may determine the data information of the missing time series data based on the time information of the received time series data.

Step S13: Determine whether a preset trigger condition for a data missing notification is currently satisfied.

After storing time information and/or a sequence number of the missing time series data, the data receiving device further determines whether a missing data subscription event is set in a subscription resource created in advance, and if the missing data subscription event exists, determines whether the trigger condition for a data missing notification that is preset in the missing data subscription event is currently satisfied.

Step S14: If the trigger condition for a data missing notification is satisfied, send data missing notification information to a target device.

The method for detecting time series data in this embodiment of the present invention is performed based on an M2M data transmission standard. In the method, the data receiving device determines, based on the data information of the time series data that is already received, whether missing of time series data of data information occurs in the data receiving process, and reports information about the missing time series data to the target device when the trigger condition for a data missing notification is satisfied, so as to implement, in the M2M data transmission system, detection and reporting of the missing time series data.

Figure 4:
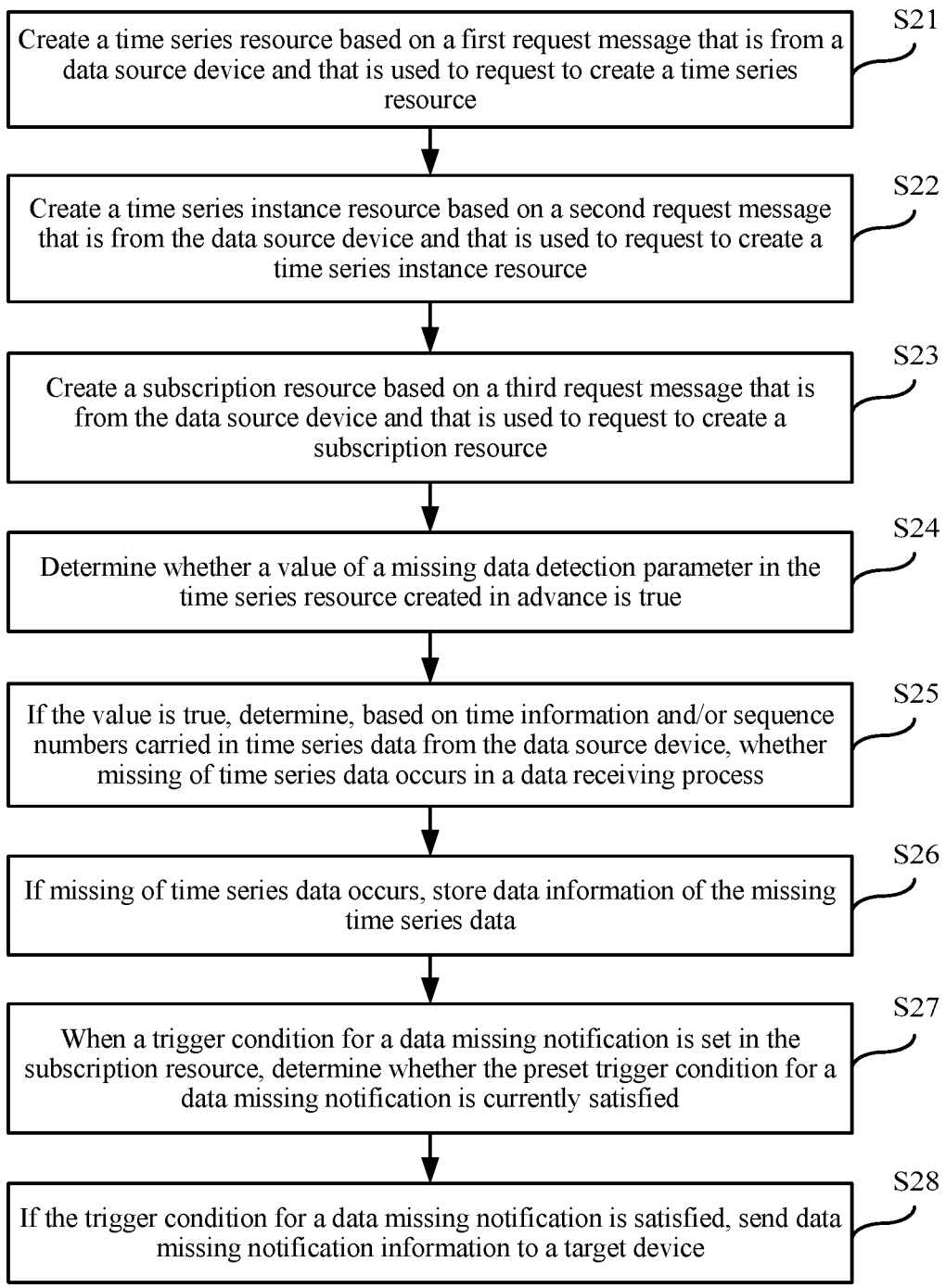
FIG. 4 is a flowchart of a method for detecting time series data according to Embodiment 2 of the present invention.

FIG. 4 is a flowchart of a method for detecting time series data according to Embodiment 2 of the present invention. The method is applied to an M2M data transmission system, and is performed by a data receiving device. As shown in FIG. 4, specific steps performed in the method are as follows.

Step S21: Create a time series resource based on a first request message that is from a data source device and that is used to request to create a time series resource.

The first request message received by the data receiving device carries the following parameters: a maximum quantity of missing data, a current quantity of missing data, and a missing data list.

The data receiving device respectively creates an attribute of the maximum quantity of missing data, an attribute of the current quantity of missing data, and a missing data list attribute in the time series resource based on the maximum quantity of missing data, the current quantity of missing data, and the missing data list that are in the first request message.

Figure 5:
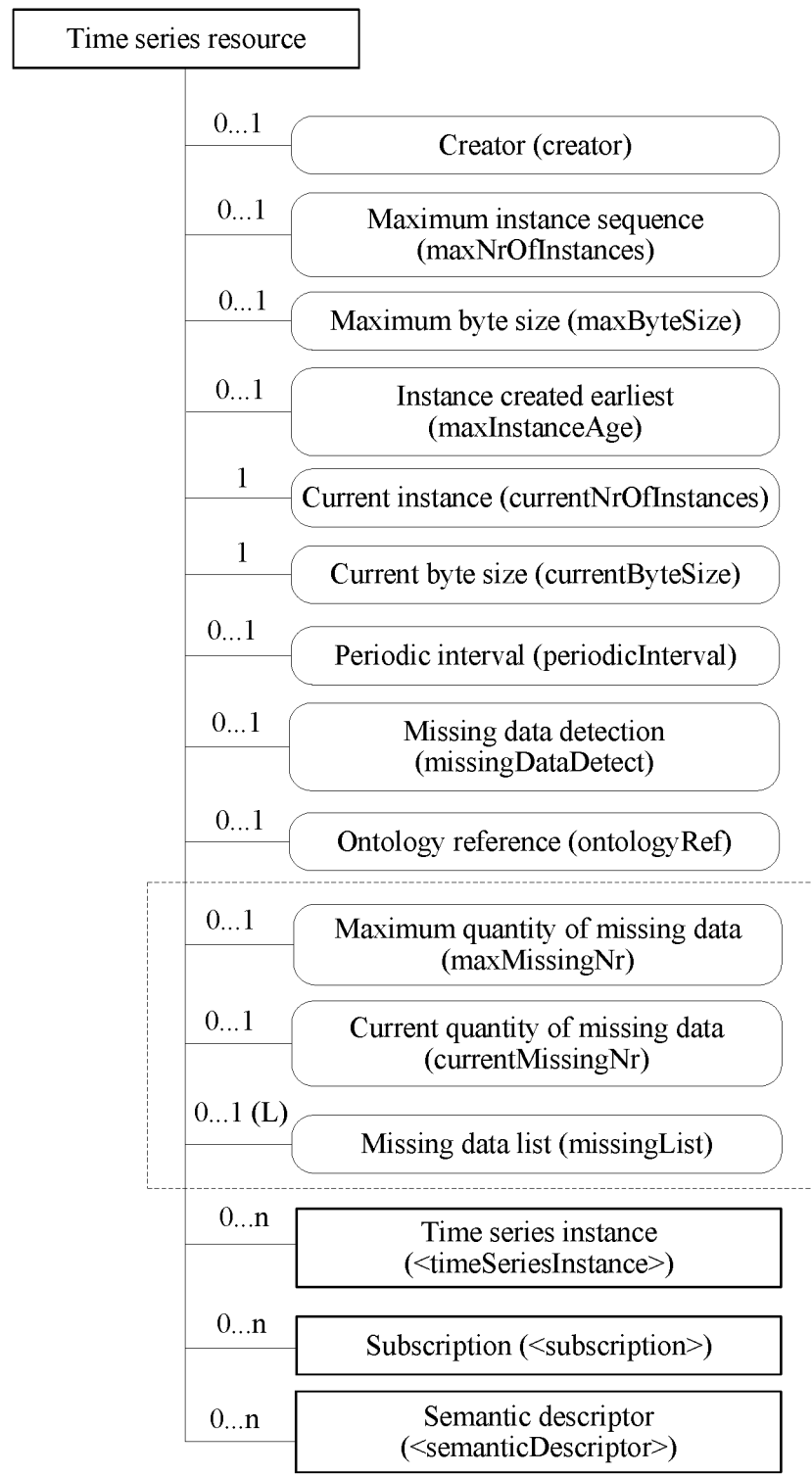
FIG. 5 is a schematic representation diagram of a time series resource with three added specified attributes.

FIG. 5 is a schematic representation diagram of a time series resource with three added specified attributes. The attribute of the maximum quantity of missing data (maxMissingNr), the attribute of the current quantity of missing data (currentMissingNr), and the missing data list (missingList) attribute are added, based on the time series resource shown in FIG. 1, to the time series resource shown in FIG. 5.

Table 1 shows attribute information of the attribute of the maximum quantity of missing data, the attribute of the current quantity of missing data, and the missing data list attribute that are added in the time series resource.

TABLE 1

| Attribute information of three newly added attributes in a time series resource | | | |
|---|---|---|---|
| Time series attribute | Multiplicity (Multiplicity) | RW/ RO/WO | Description |
| Maximum quantity of missing data (maxMissingNr) | 0 . . . 1 | RW | A maximum length of missing time series data is recorded. |
| Current quantity of missing data (currentMissingNr) | 0 . . . 1 | RO | Current quantity of missing time series data |
| Missing data list (missingList) | 0 . . . 1 (L) | RO | Time list of missing time series data |

As shown in FIG. 5 and Table 1, the attribute of the maximum quantity of missing data (maxMissingNr) is used to record the maximum quantity (which is generally a preset constant value) of missing time series data, the attribute of the current quantity of missing data (currentMissingNr) is used to record the current quantity of missing time series data, and the missing data list (missingList) is used to record data information of time series data that is already missing. When a value of the current quantity of missing data is greater than a value set for the maximum quantity of missing data, the data receiving device deletes, from the missing data list, data information of at least one piece of time series data that is stored earliest. In this way, data information of missing time series data that is newly detected can continue to be inserted into the missing data list.

Step S22: Create a time series instance resource based on a second request message that is from the data source device and that is used to request to create a time series instance resource.

The created time series instance resource is shown in FIG. 2, and the time series instance resource is a child resource of the time series resource.

Step S23: Create a subscription resource based on a third request message that is from the data source device and that is used to request to create a subscription resource.

In this embodiment, the third request message received by the data receiving device carries a trigger parameter of a time series data missing notification; the subscription resource includes a missing data subscription event that is set based on the trigger parameter of a time series data missing notification; and the missing data subscription event includes the trigger condition for a data missing notification that is set based on the trigger parameter of a time series data missing notification.

The data source device requests the data receiving device to create the subscription resource, and requests the data receiving device to create the missing data subscription event in the subscription resource, where the missing data subscription event includes the trigger condition for a data missing notification, so that the data receiving device may detect the missing time series data, and trigger, when the condition is satisfied, the data receiving device to send related information of the missing time series data to a target device.

In this embodiment of the present invention, the target device may be the data source device, or may be another device that needs to obtain information about the missing time series data.

In this embodiment, the trigger condition for a data missing notification that is set by the data receiving device based on the received trigger parameter of a time series data missing notification includes: whether a current time reaches a report time predetermined in a preset missing data report period; and/or whether a current quantity of time series data that is already missing reaches a preset report quantity.

Table 2 shows a specific definition of the trigger parameter of a time series data missing notification (timeSeriesCriteria, time series criteria) carried in the third request message.

TABLE 2

Table of a definition of a trigger parameter of a time series data missing notification

| Condition tag (Condition Tag) | Alternativity (Multiplicity) | Matching condition (Matching condition) |
|---|---|---|
| Time series criteria (timeSeriesCriteria) | 0 . . . 1 | Two parameters: a detection period (duration) and/or a quantity of missing time series data are included.<br>(1) Duration: Based on a time period that is set for the duration, a notification (notification) message is periodically triggered and a time list of missing time series data during the duration is reported.<br>(2) Quantity: When a time quantity of missing time series data reaches a preset value, a notification message is triggered.<br>(3) The duration and the quantity are set at the same time: a notification is triggered as long as either of the two conditions is first satisfied.<br>(4) A notification is triggered when the specified quantity is reached in a designated time period. |

In this embodiment of the present invention, the data receiving device sets the trigger condition for a data missing notification in an event notification criteria (eventNotificationCriteria) attribute of the subscription resource based on the trigger parameter of a time series data missing notification.

Step S24: Determine whether a value of a missing data detection parameter in the time series resource created in advance is true, and if the value is true, perform step S25; or if the value is not true, a missing data subscription event in the subscription resource returns feedback information such as a missing data detection error or a missing data detection failure.

In this embodiment of the present invention, the time series resource generated by the data receiving device further includes a missing data detection (missingDataDetect) parameter; and when a value of the missing data detection parameter is true or 1, it is determined that the value of the missing data detection parameter is true. When the missing data detection parameter is true, the data receiving device detects whether missing of time series data occurs in a data receiving process.

Step S25: Determine, based on time information and/or sequence numbers carried in time series data from the data source device, whether missing of time series data occurs in a data receiving process.

Step S26: If missing of time series data occurs, store data information of the missing time series data.

Step S27: When a trigger condition for a data missing notification is set in the subscription resource, determine whether the preset trigger condition for a data missing notification is currently satisfied.

Step S28: If the trigger condition for a data missing notification is satisfied, send data missing notification information to a target device.

For example, when a current quantity of missing time series data reaches a quantity that is set in the trigger condition for a data missing notification, the data missing notification information is sent to the data receiving device. The sent notification information may include only data missing prompt information, or may include specific information of the missing time series data.

The method for detecting time series data in this embodiment of the present invention implements, in M2M, detection and reporting of missing data.

Figure 6:
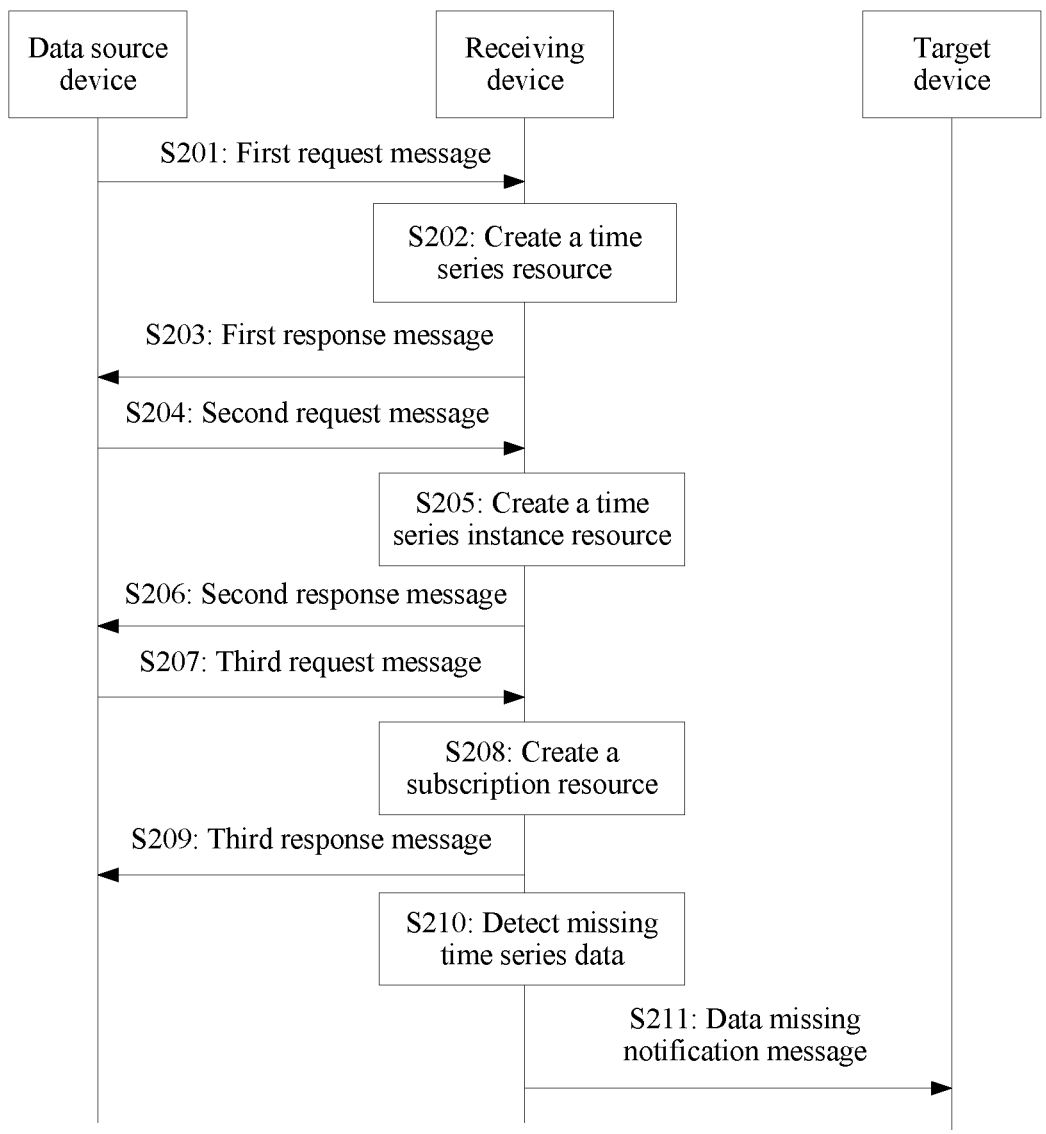
FIG. 6 is a flowchart of a method for detecting time series data according to Embodiment 3 of the present invention.

FIG. 6 is a flowchart of a method for detecting time series data according to Embodiment 3 of the present invention. The method for detecting time series data shown in FIG. 6 is a specific example of the method for detecting time series data shown in FIG. 4. The method mainly includes the following processing steps.

Step S201: A data source device sends, to a data receiving device, a first request message for requesting to create a time series resource in the data receiving device, where the first request message carries the following parameters: a maximum quantity of missing data (maxMissingNr), a current quantity of missing data (currentMissingNr), and a missing data list (missingList).

Step S202: The data receiving device creates a time series resource based on the received first request message, where newly added attributes in the created time series resource include: an attribute of the maximum quantity of missing data (maxMissingNr), an attribute of the current quantity of missing data (currentMissingNr), and a missing data list (missingList) attribute, as shown in Table 1.

Step S203: After successfully creating the time series resource, the data receiving device sends a first response message to the data source device.

Step S204: The data source device sends, to the data receiving device, a second request message for requesting to create a time series instance resource in the data receiving device.

Step S205: The data receiving device creates a time series instance resource based on the received second request message, where the time series instance resource is a child resource of the time series resource created in step S202.

The data source device may request the data receiving device to create a plurality of time series instance resources, and the plurality of created time series instance resources are all child resources of the time series resource.

Step S206: After successfully creating the time series instance resource, the data receiving device sends a second response message to the data source device.

Step S207: The data source device sends, to the data receiving device, a third request message for requesting to create a subscription resource in the data receiving device, where the third request message carries a trigger parameter of a time series data missing notification (that is, timeSeriesCriteria, time series criteria), and a rule for defining the trigger parameter of a time series data missing notification is shown in Table 2.

Based on the definition that is shown in Table 2 and that is of the trigger parameter of a time series data missing notification, a notification is sent when there is a designated quantity of missing time series data and/or when designated duration is reached. The following cases may occur.

For example, a quantity parameter in timeSeriesCriteria is set to 4. When the quantity that is detected by the data receiving device and that is of missing time series data reaches 4, a data missing notification message is sent to a target device.

For example, a time period of a detection period in timeSeriesCriteria is set to 10 minutes. The data receiving device may send a data missing notification message to a target device every 10 minutes based on a detected time series data status.

For another example, a quantity parameter in timeSeriesCriteria is set to 4, and a time period of a detection period is set to 10 minutes. The data receiving device uses 10 minutes as one detection period, and sends a data missing notification message to a target device when the quantity of missing time series data in a current detection period reaches 4; or if the quantity of missing time series data in a current detection period does not reach 4, the data receiving device enters a next detection period and collects statistics about the quantity of missing time series data again.

For another example, a parameter setting in timeSeriesCriteria is: a quantity parameter is set to 4, or a detection period is set to 10 minutes. When the quantity of missing time series data reaches 4 or a current detection time reaches 10 minutes, an operation of sending a data missing notification message to a target device is triggered as long as either of the conditions is satisfied.

Step S208: The data receiving device creates a subscription resource based on the third request message.

Specifically, a process in which the data receiving device creates the subscription resource includes: creating, by the data receiving device, a data missing notification event based on timeSeriesCriteria carried in the third request message, where the data missing notification event includes a trigger condition for a data missing notification.

In this embodiment of the present invention, the data receiving device sets the trigger condition for a data missing notification in an event notification criteria (eventNotificationCriteria) attribute of the subscription resource based on the trigger parameter of a time series data missing notification.

Step S209: After successfully creating the time series resource, the data receiving device sends a third response message to the data source device.

Step S210: The data receiving device collects and stores time series data, and detects and reports missing time series data.

In this embodiment, the time series resource generated by the data receiving device further includes a missing data detection (missingDataDetect) parameter. Before detection on time series data is performed, whether a value of the missing data detection parameter is true is further determined. When the value of the missing data detection parameter is true or 1, it is determined that the value of the missing data detection parameter is true. When the missing data detection parameter is true, the data receiving device detects whether missing of time series data occurs in a data receiving process. If the value of the missing data detection parameter is not true, a missing data subscription event in the subscription resource returns feedback information such as a missing data detection error or a missing data detection failure.

That the data receiving device reports missing time series data includes:

when determining that a current status satisfies a data missing notification condition that is set in the subscription resource, sending, by the data receiving device, a data missing notification message (Notify Request) to the target device. Specifically, the data receiving device may determine, based on a notification content type (notificationContentType) in the subscription resource, content carried in the data missing notification message. For example, the missing data list (missingList) and/or the current quantity of missing data (currentMissingNr) may be carried.

In a process of detecting missing time series data, each time missing of one piece of time series data is detected, the data receiving device inserts a data generation time (dataGenerationTime) and/or a sequence number (sequenceNr) of the missing time series data into the missing data list (missingList), and increases a value of the current quantity of missing data (currenMissingNr) by 1. When the value of the current quantity of missing data (currenMissingNr) reaches a value that is set in a maximum missing number (max Missing Nr), the data receiving device deletes at least one earliest data generation time (dataGenerationTime) and/or at least one earliest sequence number (sequenceNr) from the missing data list (missingList), so as to insert a data generation time (dataGenerationTime) and/or a sequence number (sequenceNr) of newly detected missing time series data.

For example, the quantity parameter in timeSeriesCriteria is set to 4. When the quantity that is detected by the data receiving device and that is of missing time series data reaches 4 (for example, the missing time series data includes t1, t5, t10, and t11), the data receiving device sends a data missing notification message to the target device. Specifically, the data receiving device may send only the data missing notification message to the target device based on a setting in the notification content type (notificationContentType), or add the missing data list (missingList) and/or the current quantity of missing data (currentMissingNr) to the data missing notification message.

For another example, the time period of the detection period in timeSeriesCriteria is set to 10 minutes. During specific implementation, the data receiving device may send a data missing notification message to the target device every 10 minutes regardless of whether missing of the time series data is detected. Alternatively, the data receiving device determines whether missing of time series data is detected in a current detection period (within 10 minutes). If missing of time series data is detected, a data missing notification message is reported to the target device before the current period ends and a next period for missing data detection is entered. If missing of time series data is not detected in the current period, a next period is directly entered for missing time series data detection.

Further, for example, the quantity parameter in timeSeriesCriteria is set to 4, and the time period of the detection period is set to 10 minutes. The data receiving device detects whether the quantity of missing time series data in the current detection period (within 10 minutes) reaches 4, and if the quantity reaches 4, sends a data missing notification message to the target device; or if the quantity does not reach 4, no data missing notification message is sent.

For another example, the parameter setting in timeSeriesCriteria is: the quantity parameter is set to 4, or the detection period is set to 10 minutes. The data receiving device determines whether a quantity of currently detected missing time series data reaches 4 or whether a report time (10 minutes) that is set in the detection period is reached, and sends a data missing notification message to the target device as long as either of the conditions is satisfied.

Step S211: The data receiving device sends a data missing notification message to a target device.

A specific process in which the data receiving device sends the data missing notification message to the target device may include: sending, by the data receiving device, a notification request message (Notify Request) to the target device, where the notification request message carries specific notification content, such as the missing data list (missingList) and/or the current quantity of missing data (currentMissingNr). The target device returns a notification response message to the data receiving device after receiving the notification message sent by the data receiving device.

Figure 7:
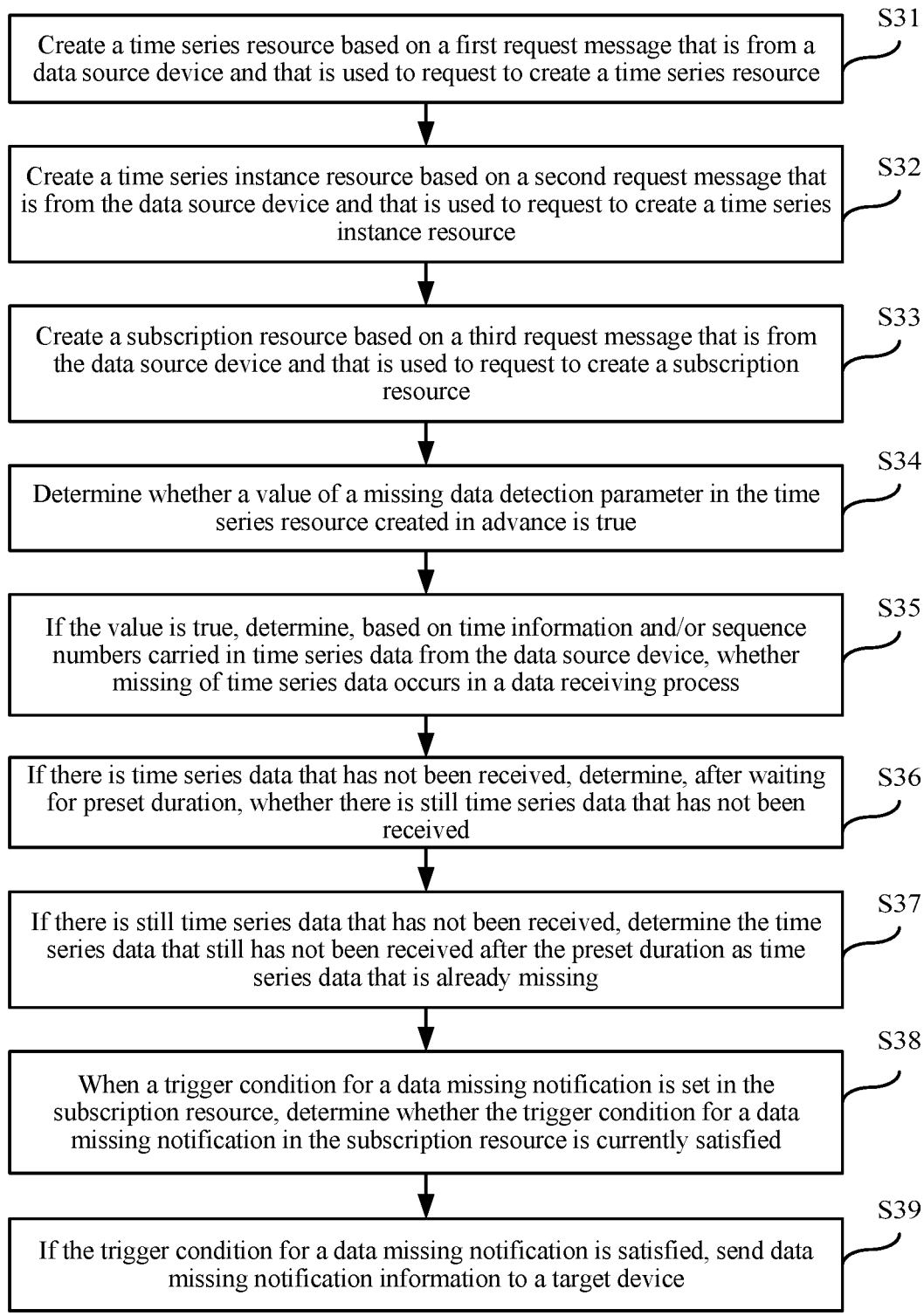
FIG. 7 is a flowchart of a method for detecting time series data according to Embodiment 4 of the present invention.

FIG. 7 is a flowchart of a method for detecting time series data according to Embodiment 4 of the present invention. The method is applied to an M2M data transmission system, and is performed by a data receiving device, such as a storage cloud. In the method in this embodiment, four attributes are added in the time series resource shown in FIG. 1: a maximum quantity of missing data, a current quantity of missing data, a missing data list, and a maximum waiting time, and a trigger condition for a data missing notification is set in an event notification criteria attribute of a subscription resource, so that the data receiving device sends a data missing notification message to a target device when detecting that a time series data missing status satisfies the trigger condition for a data missing notification. As shown in FIG. 7, specific steps performed in the method are as follows.

Step S31: Create a time series resource based on a first request message that is from a data source device and that is used to request to create a time series resource.

The first request message received by the data receiving device carries the following parameters: a maximum quantity of missing data, a current quantity of missing data, a missing data list, and a maximum waiting time.

The data receiving device respectively creates an attribute of the maximum quantity of missing data, an attribute of the current quantity of missing data, a missing data list attribute, and a maximum waiting time attribute based on the maximum quantity of missing data, the current quantity of missing data, the missing data list, and the maximum waiting time that are in the first request message.

Figure 8:
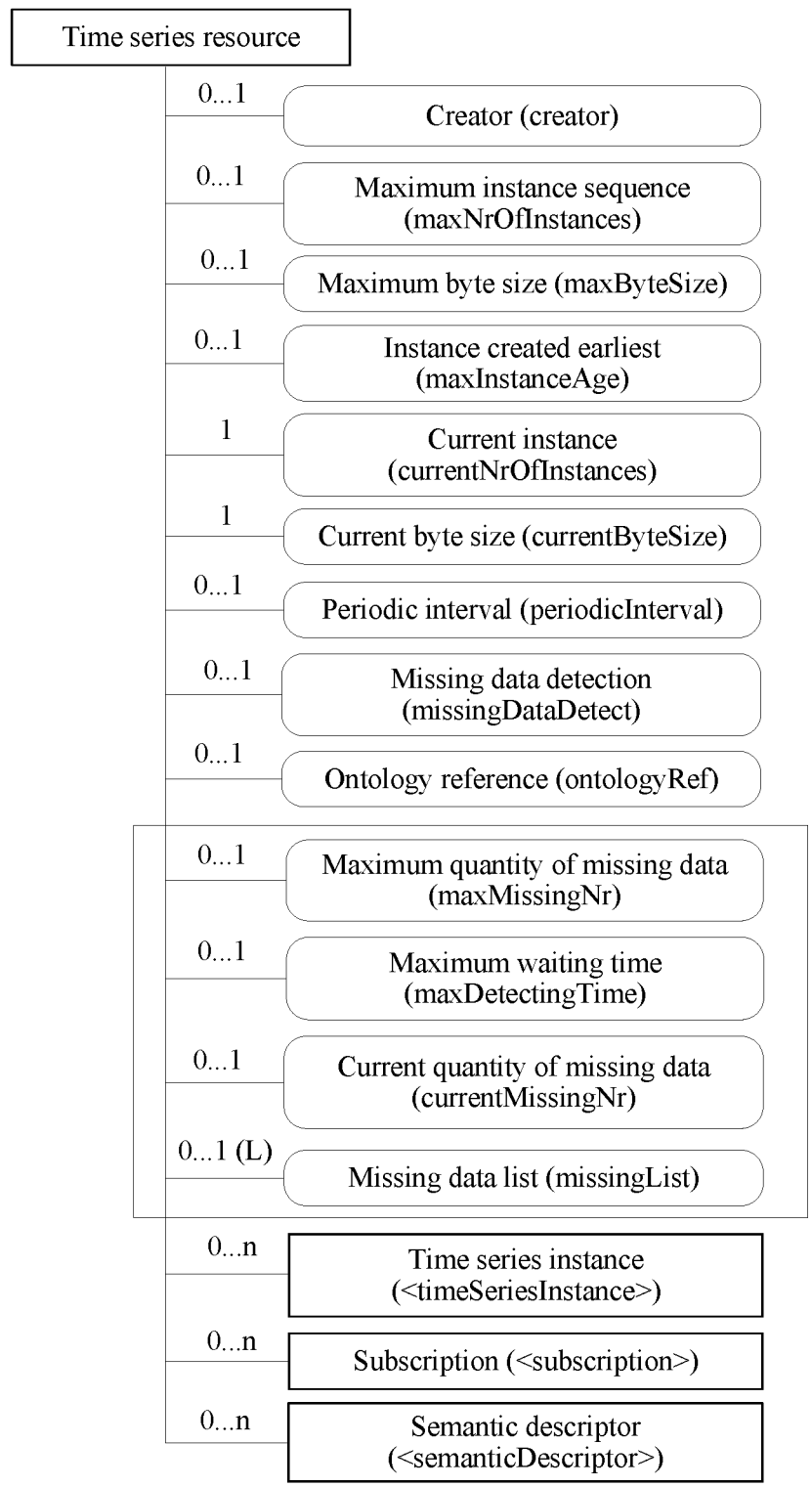
FIG. 8 is a first schematic representation diagram of a time series resource with four added specified attributes.

FIG. 8 is a first schematic representation diagram of a time series resource with four added specified attributes.

Table 3 shows attribute information of the attribute of the maximum quantity of missing data, the attribute of the current quantity of missing data, and the missing data list attribute that are added in the time series resource.

TABLE 3

Attribute information of four newly added attributes in a time series resource

| Time series attribute | Multiplicity (Multiplicity) | RW/ RO/ WO | Description |
|---|---|---|---|
| Maximum quantity of missing data (maxMissingNr) | 0 . . . 1 | RW | A maximum length of missing time series data is recorded. |
| Maximum waiting time (maxDetectingTime) | 0 . . . 1 | RW | Maximum time taken to wait before missing data that has not arrived due to a routing problem is detected |
| Current quantity of missing data (currentMissingNr) | 0 . . . 1 | RO | Current quantity of missing time series data |
| Missing data list (missingList) | 0 . . . 1 (L) | RO | Time list of missing time series data |

Meanings of the attribute of the maximum quantity of missing data, the attribute of the current quantity of missing data, and the missing data list attribute in Table 3 are the same as those in Embodiment 2, and details are not described again. The newly added maximum waiting time attribute is used to identify a maximum waiting time taken to determine time series data that has not been received as missing time series data.

Step S32: Create a time series instance resource based on a second request message that is from the data source device and that is used to request to create a time series instance resource.

The created time series instance resource is shown in FIG. 2, and the time series instance resource is a child resource of the time series resource.

Step S33. Create a subscription resource based on a third request message that is from the data source device and that is used to request to create a subscription resource.

In this embodiment, the third request message received by the data receiving device carries a trigger parameter of a time series data missing notification; the subscription resource includes a missing data subscription event that is set based on the trigger parameter of a time series data missing notification; and the missing data subscription event includes the trigger condition for a data missing notification that is set based on the trigger parameter of a time series data missing notification.

The data source device requests the data receiving device to create the subscription resource, and requests the data receiving device to create the missing data subscription event in the subscription resource, where the missing data subscription event includes the trigger condition for a data missing notification, so that the data receiving device may detect the missing time series data, and trigger, when the condition is satisfied, the data receiving device to send related information of the missing time series data to a target device.

In this embodiment, the third request message received by the data receiving device carries the trigger parameter of a time series data missing notification; and the subscription resource includes the trigger condition for a data missing notification that is set based on the trigger parameter of a time series data missing notification.

Content of the data missing notification trigger parameter that is set in this embodiment is the same as that in Table 2 of Embodiment 2, and details are not described again.

Step S34: Determine whether a value of a missing data detection parameter in the time series resource created in advance is true, and if the value is true, perform step S35; or if the value is not true, a missing data subscription event in the subscription resource returns feedback information such as a missing data detection error or a missing data detection failure.

In this embodiment of the present invention, the time series resource generated by the data receiving device further includes a missing data detection (missingDataDetect) parameter; and when a value of the missing data detection parameter is true or 1, it is determined that the value of the missing data detection parameter is true. When the missing data detection parameter is true, the data receiving device detects whether missing of time series data occurs in a data receiving process.

Step S35: Determine, based on time information and/or sequence numbers carried in time series data from the data source device, whether missing of time series data occurs in a data receiving process.

Step S36: If there is time series data that has not been received, determine, after waiting for preset duration, whether there is still time series data that has not been received.

Step S37: If there is still time series data that has not been received, determine the time series data that still has not been received after the preset duration as time series data that is already missing.

In this embodiment, values of the preset duration in S36 and S37 are the same as a value of the maximum waiting time (maxDetectingTime) in Table 3.

Step S38: When a trigger condition for a data missing notification is set in the subscription resource, determine whether the trigger condition for a data missing notification in the subscription resource is currently satisfied.

Step S39: If the trigger condition for a data missing notification is satisfied, send data missing notification information to the target device.

In the data receiving process, there may be time series data that is received after a delay due to a routing problem. Therefore, to avoid a determining error, the maximum waiting time attribute is set in this embodiment of the present invention. When determining that there is time series data that has not been received, the data receiving device waits for the preset duration, and determines, after the preset duration, whether the time series data is received. If the time series data still has not been received, the time series data is determined as missing time series data. The method for detecting time series data in this embodiment of the present invention can improve accuracy of detection and reporting of missing data.

Figure 9:
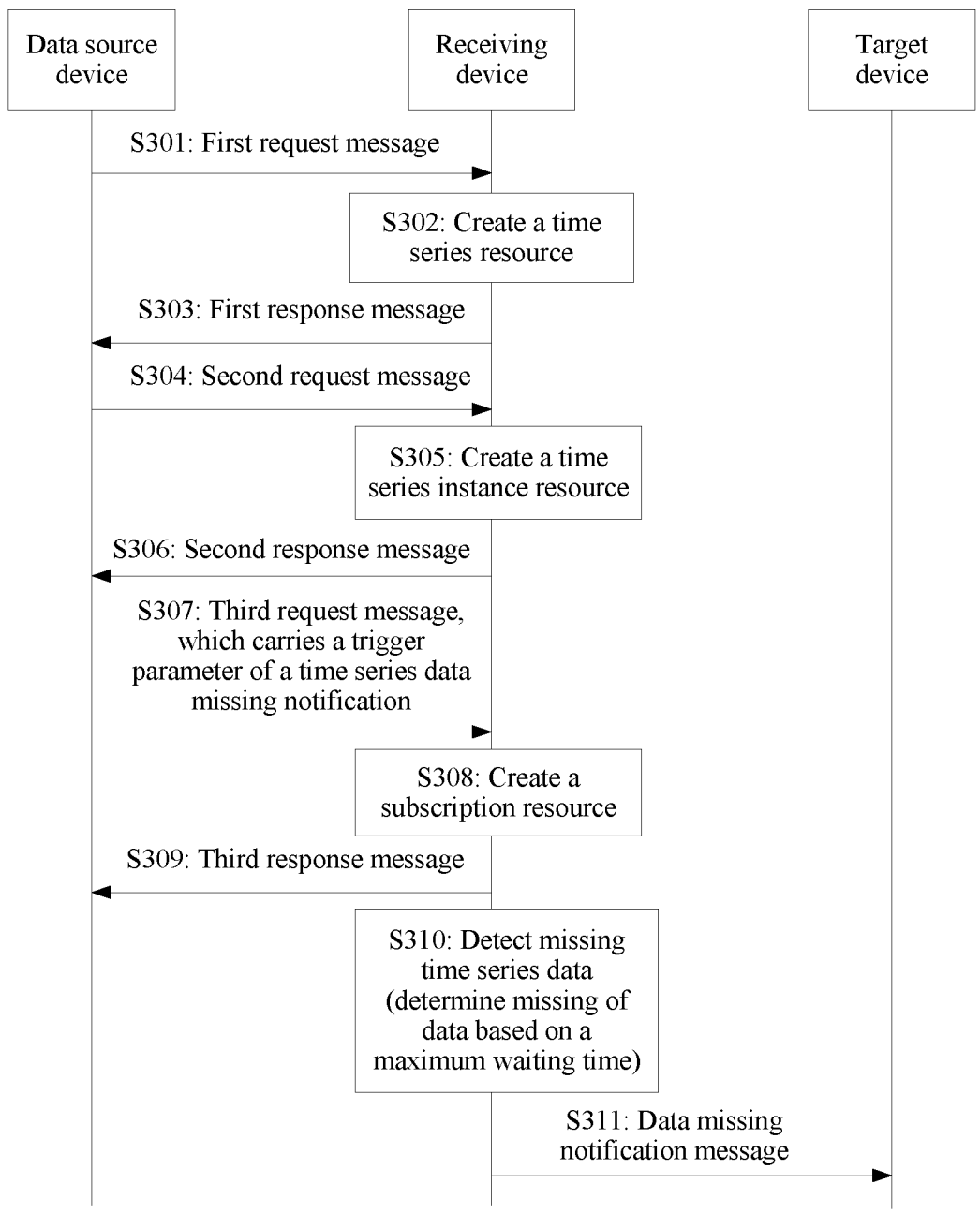
FIG. 9 is a flowchart of a method for detecting time series data according to Embodiment 5 of the present invention.

FIG. 9 is a flowchart of a method for detecting time series data according to Embodiment 5 of the present invention. The method for detecting time series data shown in FIG. 9 is a specific example of the method for detecting time series data shown in FIG. 7. The method mainly includes the following processing steps.

Step S301: A data source device sends, to a data receiving device, a first request message for requesting to create a time series resource in the data receiving device, where the first request message carries the following parameters: a maximum quantity of missing data (maxMissingNr), a current quantity of missing data (currentMissingNr), a missing data list (missingList), and a maximum waiting time (maxDetectingTime).

Step S302: The data receiving device creates a time series resource based on the received first request message, where newly added attributes in the created time series resource include: an attribute of the maximum quantity of missing data (maxMissingNr), an attribute of the current quantity of missing data (currentMissingNr), a missing data list (missingList) attribute, and a maximum waiting time (maxDetectingTime) attribute, as shown in Table 3.

Step S303: After successfully creating the time series resource, the data receiving device sends a first response message to the data source device.

Step S304: The data source device sends, to the data receiving device, a second request message for requesting to create a time series instance resource in the data receiving device.

Step S305: The data receiving device creates a time series instance resource based on the received second request message, where the time series instance resource is a child resource of the time series resource created in step S302.

The data source device may request the data receiving device to create a plurality of time series instance resources, and the plurality of created time series instance resources are all child resources of the time series resource.

Step S306: After successfully creating the time series instance resource, the data receiving device sends a second response message to the data source device.

Step S307: The data source device sends, to the data receiving device, a third request message for requesting to create a subscription resource in the data receiving device, where the third request message carries a trigger parameter of a time series data missing notification (that is, timeSeriesCriteria, time series criteria), and a rule for defining the trigger parameter of a time series data missing notification is shown in Table 2.

Based on the definition that is shown in Table 2 and that is of the trigger parameter of a time series data missing notification, a notification is sent when there is a designated quantity of missing time series data and/or when designated duration is reached. The following cases may occur.

For example, a quantity parameter in timeSeriesCriteria is set to 4. When the quantity that is detected by the data receiving device and that is of missing time series data reaches 4, a data missing notification message is sent to a target device.

For example, a time period of a detection period in timeSeriesCriteria is set to 10 minutes. The data receiving device sends a data missing notification message to the target device every 10 minutes.

For another example, a quantity parameter in timeSeriesCriteria is set to 4, and a time period of a detection period is set to 10 minutes. The data receiving device uses 10 minutes as one detection period, and sends a data missing notification message to a target device when the quantity of missing time series data in a current detection period reaches 4; or if the quantity of missing time series data in a current detection period does not reach 4, the data receiving device enters a next detection period and collects statistics about the quantity of missing time series data again.

For another example, a parameter setting in timeSeriesCriteria is: a quantity parameter is set to 4, or a detection period is set to 10 minutes. When the quantity of missing time series data reaches 4 or a current detection time reaches 10 minutes, an operation of sending a data missing notification message to a target device is triggered as long as either of the conditions is satisfied.

Step S308: The data receiving device creates a subscription resource based on the third request message.

Specifically, a process in which the data receiving device creates the subscription resource includes: creating, by the data receiving device, a data missing notification event based on timeSeriesCriteria carried in the third request message, where the data missing notification event includes a trigger condition for a data missing notification.

In this embodiment of the present invention, the data receiving device sets the trigger condition for a data missing notification in an event notification criteria (eventNotificationCriteria) attribute of the subscription resource based on the trigger parameter of a time series data missing notification.

Step S309: After successfully creating the time series resource, the data receiving device sends a third response message to the data source device.

Step S310: The data receiving device collects and stores time series data, and detects and reports missing time series data.

In this embodiment, the time series resource generated by the data receiving device further includes a missing data detection (missingDataDetect) parameter. Before detection on time series data is performed, whether a value of the missing data detection parameter is true is further determined. When the value of the missing data detection parameter is true or 1, it is determined that the value of the missing data detection parameter is true. When the missing data detection parameter is true, the data receiving device detects whether missing of time series data occurs in a data receiving process. If the value of the missing data detection parameter is not true, a missing data subscription event in the subscription resource returns feedback information such as a missing data detection error or a missing data detection failure.

In this embodiment of the present invention, the data receiving device detects and reports missing time series data based on the maximum waiting time (maxDetectingTime), the maximum quantity of missing data (maxMissingNr), the current quantity of missing data (currentMissingNr), and a missing data list (missingList) parameter that are in the time series resource.

Specifically, that the data receiving device detects missing time series data includes: determining, by the data receiving device based on time information that is carried in the time series data from the data source device, whether missing of time series data occurs in the data receiving process; if there is time series data that has not been received, determining, after waiting for preset duration, whether there is still time series data that has not been received; and if there is still time series data that has not been received, determining the time series data that still has not been received after the preset duration as time series data that is already missing.

That the data receiving device reports time series data includes: when determining that a current status satisfies a data missing notification condition that is set in the subscription resource, sending, by the data receiving device, a data missing notification message (Notify Request) to the target device. Specifically, the data receiving device may determine, based on a notification content type (notificationContentType) in the subscription resource, content carried in the data missing notification message. For example, the missing data list (missingList) and/or the current quantity of missing data (currentMissingNr) may be carried.

In a process of detecting missing time series data, each time missing of one piece of time series data is detected, the data receiving device inserts a data generation time (dataGenerationTime) and/or a sequence number (sequenceNr) of the missing time series data into the missing data list (missingList), and increases a value of the current quantity of missing data (currenMissingNr) by 1. When the value of the current quantity of missing data (currenMissingNr) reaches a value that is set in a maximum missing number (maxMissingNr), the data receiving device deletes at least one earliest data generation time (dataGenerationTime) and/or at least one earliest sequence number (sequenceNr) from the missing data list (missingList), so as to insert a data generation time (dataGenerationTime) and/or a sequence number (sequenceNr) of newly detected missing time series data.

For example, the quantity parameter in timeSeriesCriteria is set to 4. When the quantity that is detected by the data receiving device and that is of missing time series data reaches 4 (for example, the missing time series data includes t1, t5, t10, and t11), the data receiving device sends a data missing notification message to the target device. Specifically, the data receiving device may send only the data missing notification message to the target device based on a setting in the notification content type (Notification Content Type), or add the missing data list (missingList) and/or the current quantity of missing data (currentMissingNr) to the data missing notification message.

For another example, the time period of the detection period in timeSeriesCriteria is set to 10 minutes. During specific implementation, the data receiving device may send a data missing notification message to the target device every 10 minutes regardless of whether missing of the time series data is detected. Alternatively, the data receiving device determines whether missing of time series data is detected in a current detection period (within 10 minutes). If missing of time series data is detected, a data missing notification message is reported to the target device before the current period ends and a next period for missing data detection is entered. If missing of time series data is not detected in the current period, a next period is directly entered for missing time series data detection.

Further, for example, the quantity parameter in timeSeriesCriteria is set to 4, and the time period of the detection period is set to 10 minutes. The data receiving device detects whether the quantity of missing time series data in the current detection period (within 10 minutes) reaches 4, and if the quantity reaches 4, sends a data missing notification message to the target device; or if the quantity does not reach 4, no data missing notification message is sent.

For another example, the parameter setting in timeSeriesCriteria is: the quantity parameter is set to 4, or the detection period is set to 10 minutes. The data receiving device determines whether a quantity of currently detected missing time series data reaches 4 or whether a report time (10 minutes) that is set in the detection period is reached, and sends a data missing notification message to the target device as long as either of the conditions is satisfied.

Step S311: The data receiving device sends a data missing notification message to a target device.

A specific process in which the data receiving device sends the data missing notification message to the target device may include: sending, by the data receiving device, a notification request message (Notify Request) to the target device, where the notification request message carries specific notification content, such as the missing data list (missingList) and/or the current quantity of missing data (currentMissingNr). The target device returns a notification response message to the data receiving device after receiving the notification message sent by the data receiving device.

Figure 10:
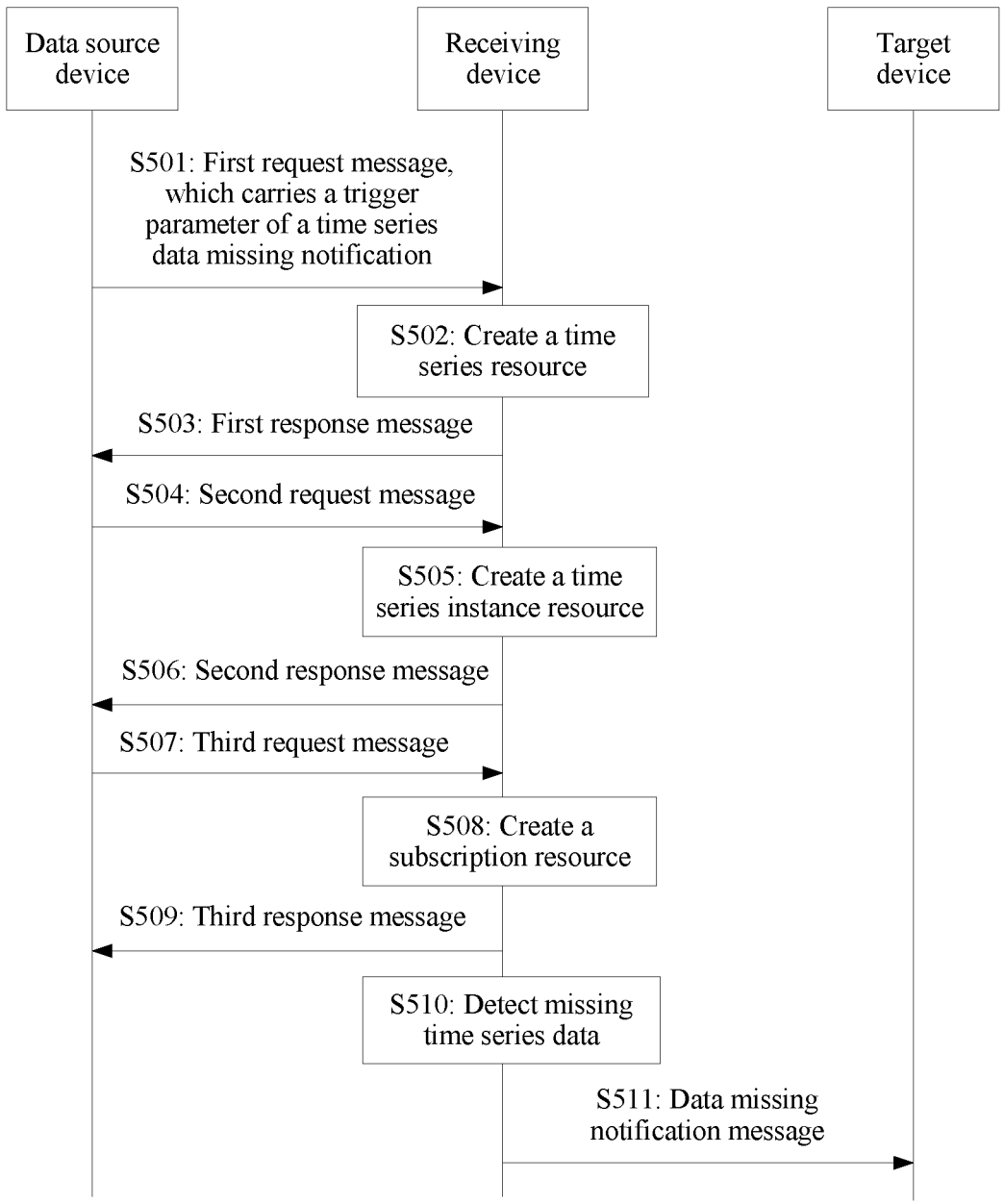
FIG. 10 is a flowchart of a method for detecting time series data according to Embodiment 6 of the present invention.

FIG. 10 is a flowchart of a method for detecting time series data according to Embodiment 6 of the present invention. The method is applied to an M2M data transmission system, and is performed by a data receiving device, such as a storage cloud. In the method in this embodiment, four attributes are added in the time series resource shown in FIG. 1: a maximum quantity of missing data, a current quantity of missing data, a missing data list, and a trigger parameter of a time series data missing notification, and a trigger condition for a data missing notification is set in an event notification criteria attribute of a subscription resource, so that the data receiving device sends a data missing notification message to a target device when detecting that a time series data missing status satisfies the trigger condition for a data missing notification. As shown in FIG. 10, specific steps performed in the method are as follows.

Step S401: A data source device sends, to the data receiving device, a first request message for requesting to create a time series resource in the data receiving device.

The first request message carries the following parameters: a maximum quantity of missing data, a current quantity of missing data, a missing data list, and a trigger parameter of a time series data missing notification.

Step S402: The data receiving device creates a time series resource based on the first request message.

The data receiving device respectively creates an attribute of the maximum quantity of missing data, an attribute of the current quantity of missing data, a missing data list attribute, and an attribute of the trigger parameter of a time series data missing notification in the time series resource based on the maximum quantity of missing data, the current quantity of missing data, the missing data list, and the trigger parameter of a time series data missing notification that are in the received first request message.

Table 4 shows attribute information of the attribute of the maximum quantity of missing data, the attribute of the current quantity of missing data, the missing data list attribute, and the time series data missing notification parameter attribute that are added in the time series resource.

The attribute of the maximum quantity of missing data, the attribute of the current quantity of missing data, and the missing data list attribute in Table 4 of this embodiment are the same as those in Table 1 of Embodiment 2, and details are not described again. The attribute of the trigger parameter of a time series data missing notification in Table 4 is the same as that in a definition table of the trigger parameter of a time series data missing notification in Table 2, and details are not described again.

Step S403: After successfully creating the time series resource, the data receiving device sends a first response message to the data source device.

Step S404: The data source device sends, to the data receiving device, a second request message for requesting to create a time series instance resource in the data receiving device.

Step S405: The data receiving device creates a time series instance resource based on the received second request message, where the time series instance resource is a child resource of the time series resource created in step S402.

Step S406: After successfully creating the time series instance resource, the data receiving device sends a second response message to the data source device.

Step S407: A data source device sends, to the data receiving device, a third request message for requesting to create a subscription resource in the data receiving device.

Step S408: The data receiving device creates a subscription resource based on the third request message and a data missing notification trigger parameter in the first request message.

Specifically, a process in which the data receiving device creates the subscription resource includes: creating, by the data receiving device, a data missing notification event based on the data missing notification trigger parameter in

TABLE 4

Attribute information of four newly added attributes in a time series resource

| Time series attribute | Multiplicity (Multiplicity) | RW/RO/WO | Description |
| --- | --- | --- | --- |
| Maximum quantity of missing data (maxMissingNr) | 0 . . . 1 | RW | A maximum length of missing time series data is recorded. |
| Current quantity of missing data (currentMissingNr) | 0 . . . 1 | RO | Current quantity of missing time series data |
| Missing data list (missingList) | 0 . . . 1 (L) | RO | Time list of missing time series data |
| Time series criteria (timeSeriesCriteria) | 0 . . . 1 | WO | Two parameters: a detection period (duration) and/or a quantity of missing time series data are included. (1) Duration: Based on a time period that is set for the duration, a notification (notification) message is periodically triggered and a time list of missing time series data during the duration is reported. (2) Quantity: When a time quantity of missing time series data reaches a preset value, a notification message is triggered. (3) The duration and the quantity are set at the same time: a notification is triggered as long as either of the two conditions is first satisfied. (4) A notification message is sent when the specified quantity is reached in a designated time period. | the first request message, where the data missing notification event includes a trigger condition for a data missing notification.

In this embodiment of the present invention, the data receiving device sets the trigger condition for a data missing notification in an event notification criteria (eventNotificationCriteria) attribute of the subscription resource based on the trigger parameter of a time series data missing notification.

Step S409: After successfully creating the time series resource, the data receiving device sends a third response message to the data source device.

Step S410: The data receiving device collects and stores time series data, and detects and reports missing time series data.

In this embodiment, the time series resource generated by the data receiving device further includes a missing data detection (missingDataDetect) parameter. Before detection on time series data is performed, whether a value of the missing data detection parameter is true is further determined. When the value of the missing data detection parameter is true or 1, it is determined that the value of the missing data detection parameter is true. When the missing data detection parameter is true, the data receiving device detects whether missing of time series data occurs in a data receiving process. If the value of the missing data detection parameter is not true, a missing data subscription event in the subscription resource returns feedback information such as a missing data detection error or a missing data detection failure.

Further, a method for detecting and reporting missing time series data by the data receiving device in this embodiment is the same as that in Embodiment 2, and details are not described again.

Step S411: The data receiving device sends a data missing notification message to the target device.

A specific process in which the data receiving device sends the data missing notification message to the target device may include: sending, by the data receiving device, a notification request message (Notify Request) to the target device, where the notification request message carries specific notification content, such as the missing data list (missingList) and/or the current quantity of missing data (currentMissingNr). The target device returns a notification response message to the data receiving device after receiving the notification message sent by the data receiving device.

Figure 11:
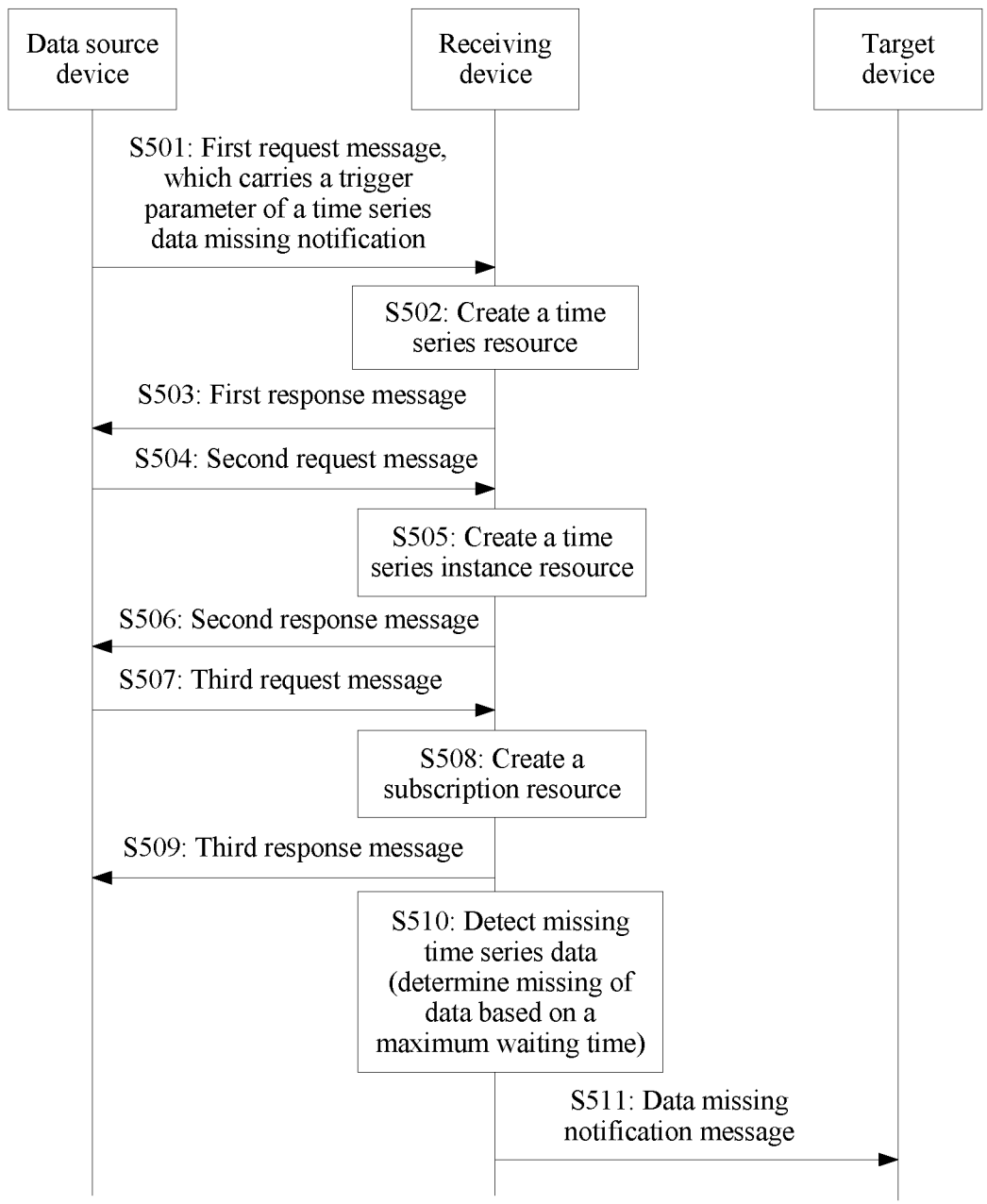
FIG. 11 is a flowchart of a method for detecting time series data according to Embodiment 7 of the present invention.

FIG. 11 is a flowchart of a method for detecting time series data according to Embodiment 7 of the present invention. The method is applied to an M2M data transmission system, and is performed by a data receiving device, such as a storage cloud. In the method in this embodiment, five attributes are added in the time series resource shown in FIG. 1: a maximum quantity of missing data, a current quantity of missing data, a missing data list, a maximum waiting time, and a trigger parameter of a time series data missing notification, and a trigger condition for a data missing notification is set in an event notification criteria attribute of a subscription resource, so that the data receiving device sends a data missing notification message to a target device when detecting that a time series data missing status satisfies the trigger condition for a data missing notification. As shown in FIG. 11, specific steps performed in the method are as follows.

Step S501: A data source device sends, to the data receiving device, a first request message for requesting to create a time series resource in the data receiving device.

The first request message carries the following parameters: a maximum quantity of missing data, a current quantity of missing data, a missing data list, and a trigger parameter of a time series data missing notification.

Step S502: The data receiving device creates a time series resource based on the first request message.

The data receiving device respectively creates an attribute of the maximum quantity of missing data, an attribute of the current quantity of missing data, a missing data list attribute, and an attribute of the trigger parameter of a time series data missing notification in the time series resource based on the maximum quantity of missing data, the current quantity of missing data, the missing data list, and the trigger parameter of a time series data missing notification that are in the received first request message.

Table 5 shows attribute information of the attribute of the maximum quantity of missing data, the attribute of the current quantity of missing data, the missing data list attribute, and the time series data missing notification attribute that are added in the time series resource.

TABLE 5

Attribute information of five newly added attributes in a time series resource

| Time series attribute | Multiplicity (Multiplicity) | RW/RO/WO | Description |
|---|---|---|---|
| Maximum quantity of missing data (maxMissingNr) | 0 . . . 1 | RW | A maximum length of missing time series data is recorded. |
| Maximum waiting time (maxDetectingTime) | 0 . . . 1 | RW | Maximum time taken to wait before missing data that has not arrived due to a routing problem is detected |
| Current quantity of missing data (currentMissingNr) | 0 . . . 1 | RO | Current quantity of missing time series data |
| Missing data list (missingList) | 0 . . . 1 (L) | RO | Time list of missing time series data |
| Time series criteria (timeSeriesCriteria) | 0 . . . 1 | WO | Two parameters: a detection period (duration) and/or a quantity of missing time series data are included.<br>(1) Duration: Based on a time period that is set for the duration, a notification (notification) message |

TABLE 5-continued

Attribute information of five newly added attributes in a time series resource

| Time series attribute | Multiplicity (Multiplicity) | RW/RO/WO | Description |
| --- | --- | --- | --- |
| | | | is periodically triggered and a time list of missing time series data during the duration is reported.<br>(2) Quantity: When a time quantity of missing time series data reaches a preset value, a notification message is triggered.<br>(3) The duration and the quantity are set at the same time: a notification is triggered as long as either of the two conditions is first satisfied.<br>(4) A notification message is sent when the specified quantity is reached in a designated time period. |

The attribute of the maximum quantity of missing data, the attribute of the current quantity of missing data, the missing data list attribute, and the time series data missing notification attribute in Table 5 of this embodiment are the same as those in Table 4, and details are not described again. A maximum waiting time attribute in Table 5 is the same as that in Table 4, and details are not described again.

Step S503: After successfully creating the time series resource, the data receiving device sends a first response message to the data source device.

Step S504: The data source device sends, to the data receiving device, a second request message for requesting to create a time series instance resource in the data receiving device.

Step S505: The data receiving device creates a time series instance resource based on the received second request message, where the time series instance resource is a child resource of the time series resource created in step S502.

Step S506: After successfully creating the time series instance resource, the data receiving device sends a second response message to the data source device.

Step S507: A data source device sends, to the data receiving device, a third request message for requesting to create a subscription resource in the data receiving device.

Step S508: The data receiving device creates a subscription resource based on the third request message and a data missing notification trigger parameter in the first request message.

Specifically, a process in which the data receiving device creates the subscription resource includes: creating, by the data receiving device, a data missing notification event based on the data missing notification trigger parameter in the first request message, where the data missing notification event includes a trigger condition for a data missing notification.

In this embodiment of the present invention, the data receiving device sets the trigger condition for a data missing notification in an event notification criteria (eventNotificationCriteria) attribute of the subscription resource based on the trigger parameter of a time series data missing notification.

Step S509: After successfully creating the time series resource, the data receiving device sends a third response message to the data source device.

Step S510: The data receiving device collects and stores time series data, and detects and reports missing time series data.

In this embodiment, the time series resource generated by the data receiving device further includes a missing data detection (missingDataDetect) parameter. Before detection on time series data is performed, whether a value of the missing data detection parameter is true is further determined. When the value of the missing data detection parameter is true or 1, it is determined that the value of the missing data detection parameter is true. When the missing data detection parameter is true, the data receiving device detects whether missing of time series data occurs in a data receiving process. If the value of the missing data detection parameter is not true, a missing data subscription event in the subscription resource returns feedback information such as a missing data detection error or a missing data detection failure.

Further, a method for detecting and reporting missing time series data by the data receiving device in this embodiment is the same as that in Embodiment 4, and details are not described again.

Step S511: The data receiving device sends a data missing notification message to the target device.

A specific process in which the data receiving device sends the data missing notification message to the target device may include: sending, by the data receiving device, a notification request message (Notify Request) to the target device, where the notification request message carries specific notification content, such as the missing data list (missingList) and/or the current quantity of missing data (currentMissingNr). The target device returns a notification response message to the data receiving device after receiving the notification message sent by the data receiving device.

Figure 12:
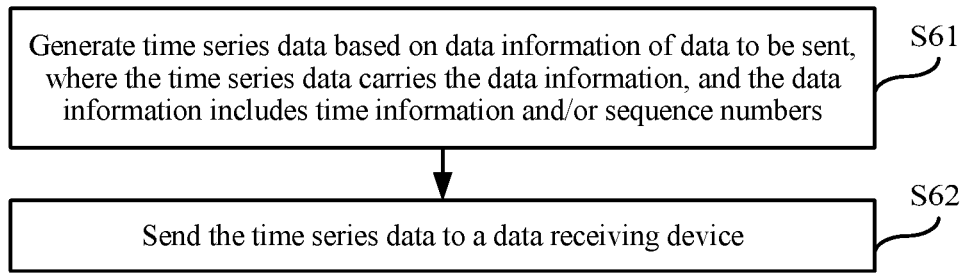
FIG. 12 is a flowchart of a method for detecting time series data according to Embodiment 8 of the present invention.

FIG. 12 is a flowchart of a method for detecting time series data according to Embodiment 8 of the present invention. The method is applied to an M2M data transmission system, and is performed by a data source device. The data source device refers to various devices that can generate time series data, for example, a detector sensor. In this embodiment, the method mainly includes the following steps:

Step S61: Generate time series data based on data information of data to be sent, where the time series data carries the data information, and the data information includes time information and/or sequence numbers.

Step S62: Send the time series data to a data receiving device.

The time series data sent to the data receiving device is used by the data receiving device to determine, based on time information and/or sequence numbers carried in received time series data, whether missing of time series data occurs in a data receiving process, and if missing of time series data occurs, store data information of the missing time series data. The data receiving device further determines whether a preset trigger condition for a data missing notification is currently satisfied, and if the trigger condition for a data missing notification is satisfied, sends data missing notification information to a target device.

Figure 13:
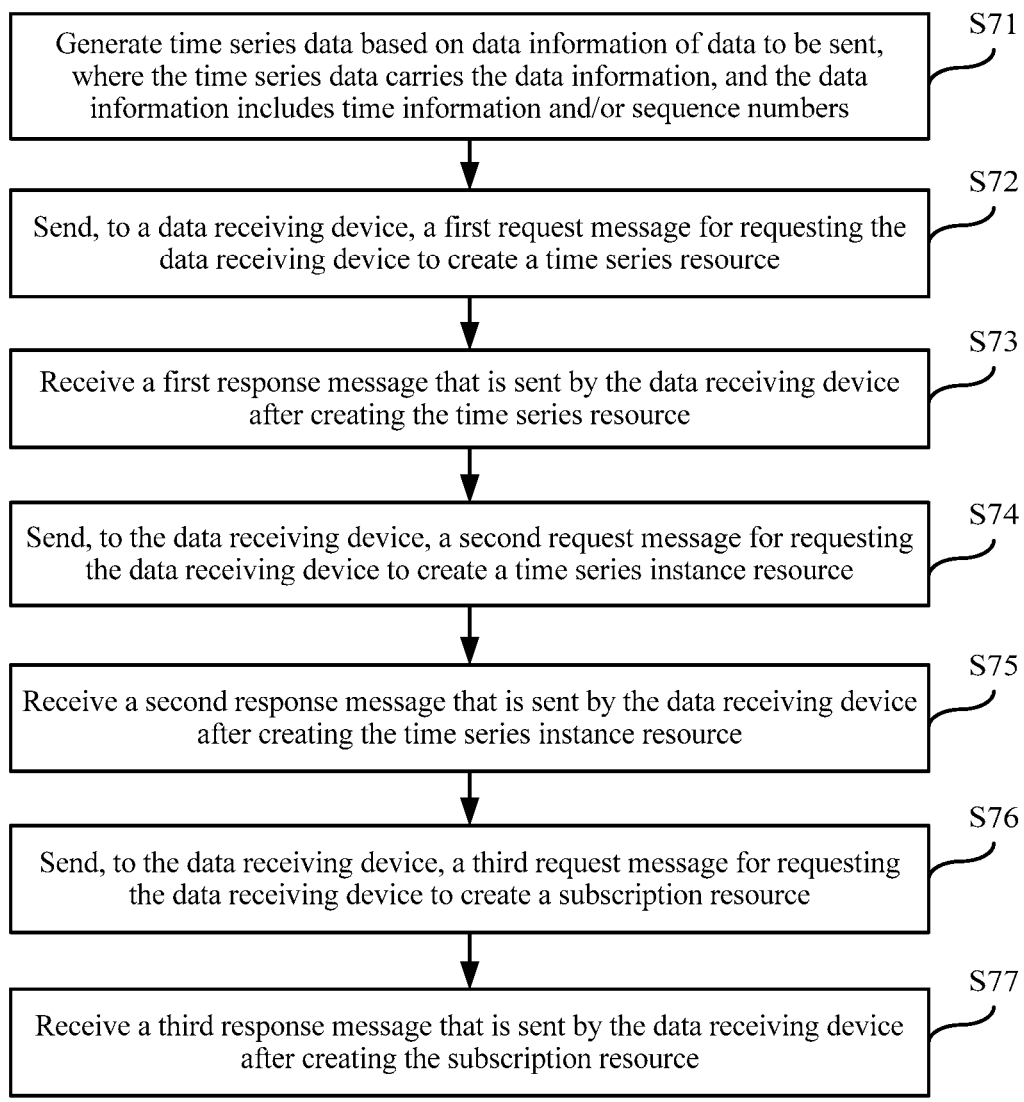
FIG. 13 is a flowchart of a method for detecting time series data according to Embodiment 9 of the present invention.

FIG. 13 is a flowchart of a method for detecting time series data according to Embodiment 9 of the present invention. The method is applied to an M2M data transmission system, and mainly includes the following steps.

Step S71: Generate time series data based on data information of data to be sent, where the time series data carries the data information, and the data information includes time information and/or sequence numbers.

Step S72: Send, to a data receiving device, a first request message for requesting the data receiving device to create a time series resource.

The first request message carries the following parameters: a maximum quantity of missing data, a current quantity of missing data, and a missing data list, so that the data receiving device respectively creates an attribute of the maximum quantity of missing data, an attribute of the current quantity of missing data, and a missing data list attribute in the time series resource based on the maximum quantity of missing data, the current quantity of missing data, and the missing data list.

The attribute of the maximum quantity of missing data is used to record a maximum quantity of missing time series data, the attribute of the current quantity of missing data is used to record a current quantity of missing time series data, and the missing data list is used to record time information and/or a sequence number of time series data that is already missing.

Step S73: Receive a first response message that is sent by the data receiving device after creating the time series resource.

Step S74: Send, to the data receiving device, a second request message for requesting the data receiving device to create a time series instance resource.

Step S75: Receive a second response message that is sent by the data receiving device after creating the time series instance resource.

The time series instance resource is a child resource of the time series resource. The time series resource and the time series instance resource are used to store attribute information of the time series data.

Step S76: Send, to the data receiving device, a third request message for requesting the data receiving device to create a subscription resource.

In this embodiment, the third request message carries a trigger parameter of a time series data missing notification, so that the data receiving device sets a missing data subscription event in the created subscription resource based on the trigger parameter of a time series data missing notification, and the missing data subscription event includes a trigger condition for a data missing notification that is set based on the trigger parameter of a time series data missing notification.

Step S77: Receive a third response message that is sent by the data receiving device after creating the subscription resource.

The embodiments of the present invention further provide Embodiment 9. An improvement is made to Embodiment 9 based on Embodiment 8. In this embodiment, the first request message sent to the data receiving device further carries a maximum waiting time, so that the data receiving device creates a maximum waiting time attribute in the time series resource based on the maximum waiting time. The maximum waiting time attribute is used by the data receiving device to identify a maximum waiting time taken to determine time series data that has not been received as missing time series data.

The embodiments of the present invention further provide Embodiment 10. An improvement is made to Embodiment 10 based on Embodiment 8. In this embodiment, the first request message sent to the data receiving device further carries a trigger parameter of a time series data missing notification, so that the data receiving device sets a missing data subscription event in a subscription resource of the time series resource based on the trigger parameter of a time series data missing notification, and the missing data subscription event includes a trigger condition for a data missing notification that is set based on the trigger parameter of a time series data missing notification.

The embodiments of the present invention further provide Embodiment 11. An improvement is made to Embodiment 11 based on Embodiment 9. In this embodiment, the first request message sent to the data receiving device further carries a trigger parameter of a time series data missing notification, so that the data receiving device sets a missing data subscription event in a subscription resource of the time series resource based on the trigger parameter of a time series data missing notification, and the missing data subscription event includes a trigger condition for a data missing notification that is set based on the trigger parameter of a time series data missing notification. The third request message no longer carries the trigger parameter of a time series data missing notification.

Figure 14:
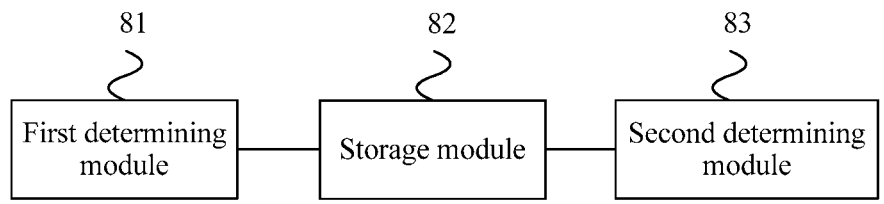
FIG. 14 is a schematic structural diagram of an apparatus for detecting time series data according to Embodiment 1 of the present invention.

FIG. 14 is a schematic structural diagram of an apparatus for detecting time series data according to Embodiment 1 of the present invention. The apparatus is applied to a data transmission system. As shown in FIG. 14, the apparatus includes a first determining module 81, a storage module 82, and a second determining module 83.

The first determining module 81 is configured to determine, based on data information carried in time series data from a data source device, whether missing of time series data occurs in a data receiving process, where the data information includes time information and/or sequence numbers.

The storage module 82 is configured to: if missing of time series data occurs, store data information of the missing time series data.

The second determining module 83 is configured to determine whether a preset trigger condition for a data missing notification is currently satisfied.

A notification message sending module is configured to: if the trigger condition for a data missing notification is satisfied, send data missing notification information to a target device.

In the foregoing embodiment, the first determining module 81 is further configured to:

before determining, based on the data information carried in the time series data from the data source device, whether missing of time series data occurs in the data receiving process, determine whether a value of a missing data detection parameter in a time series resource created in advance is true; and if the value is true, determine, based on the data information carried in the time series data from the data source device, whether missing of time series data occurs in the data receiving process.

In the foregoing embodiment, the apparatus for detecting time series data further includes a time series resource creation module, configured to: before whether missing of time series data occurs in the data receiving process is determined based on the data information carried in the time series data from the data source device, create a time series resource based on a first request message that is from the data source device and that is used to request to create a time series resource.

The first request message carries the following parameters: a maximum quantity of missing data, a current quantity of missing data, and a missing data list; and the time series resource includes: an attribute of the maximum quantity of missing data, an attribute of the current quantity of missing data, and a missing data list attribute that are respectively created based on the maximum quantity of missing data, the current quantity of missing data, and the missing data list.

The attribute of the maximum quantity of missing data is used to record a maximum quantity of missing time series data, the attribute of the current quantity of missing data is used to record a current quantity of missing time series data, and the missing data list is used to record time information and/or a sequence number of time series data that is already missing.

In the foregoing embodiment, the parameters carried in the first request message further include a maximum waiting time.

The time series resource further includes a maximum waiting time attribute that is created based on the maximum waiting time. The maximum waiting time attribute is used to identify a maximum waiting time taken to determine time series data that has not been received as missing time series data.

In the foregoing embodiment, the parameters carried in the first request message further include a trigger parameter of a time series data missing notification.

The time series resource further includes a subscription resource, and the subscription resource includes a missing data subscription event that is set based on the trigger parameter of a time series data missing notification.

The missing data subscription event includes the trigger condition for a data missing notification that is set based on the trigger parameter of a time series data missing notification.

In the foregoing embodiment, the apparatus for detecting time series data further includes:

a subscription resource creation module, configured to create a subscription resource based on a second request message that is from the data source device and that is used to request to create a subscription resource.

The subscription resource is a child resource of the time series resource, and the second request message carries a trigger parameter of a time series data missing notification.

The subscription resource includes a missing data subscription event that is set based on the trigger parameter of a time series data missing notification.

The missing data subscription event includes the trigger condition for a data missing notification that is set based on the trigger parameter of a time series data missing notification.

In the foregoing embodiment, the first determining module 81 is specifically configured to:

receive periodic time series data from the data source device; and determine, based on a time period carried in the received periodic time series data or consecutiveness of a sequence number corresponding to a time period, whether missing of time series data occurs in the data receiving process.

In the foregoing embodiment, the first determining module 81 is specifically configured to:

determine, based on the time period carried in the received periodic time series data or the consecutiveness of the sequence number corresponding to the time period, whether there is time series data that has not been received;

if there is time series data that has not been received, determine, after waiting for preset duration, whether there is still time series data that has not been received; and if there is still time series data that has not been received, determine the time series data that still has not been received after the preset duration as time series data that is already missing.

In the foregoing embodiment, the second determining module 83 is further configured to: determine whether a missing data subscription event is set in a subscription resource created in advance; and if the missing data subscription event exists, determine whether the trigger condition for a data missing notification that is preset in the missing data subscription event is currently satisfied.

In the foregoing embodiment, the trigger condition for a data missing notification includes:

whether a current time reaches a report time predetermined in a preset missing data report period; and/or whether a current quantity of time series data that is already missing reaches a preset report quantity.

Figure 15:
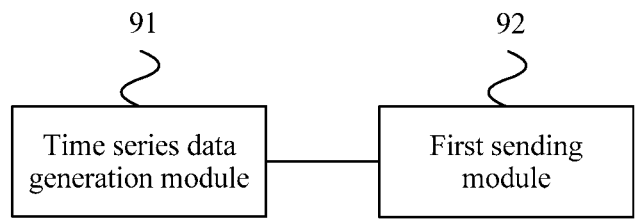
FIG. 15 is a schematic structural diagram of an apparatus for detecting time series data according to Embodiment 2 of the present invention.

FIG. 15 is a schematic structural diagram of an apparatus for detecting time series data according to Embodiment 2 of the present invention. The apparatus is applied to a data transmission system. As shown in FIG. 15, the apparatus includes a time series data generation module 91 and a first sending module 92.

The time series data generation module 91 is configured to generate time series data based on data information of data to be sent, where the time series data carries the data information, and the data information includes time information and/or sequence numbers.

The first sending module 92 is configured to send the time series data to a data receiving device, so that the data receiving device determines, based on the time information and/or the sequence numbers carried in received time series data, whether missing of time series data occurs in a data receiving process, and if missing of time series data occurs, stores data information of the missing time series data. The data receiving device further determines whether a preset trigger condition for a data missing notification is currently satisfied, and if the trigger condition for a data missing notification is satisfied, sends data missing notification information to a target device.

In the foregoing embodiment, the first sending module 92 is further configured to: before sending the time series data to the data receiving device, send, to the data receiving device, a first request message for requesting the data receiving device to create a time series resource.

The first request message carries the following parameters: a maximum quantity of missing data, a current quantity of missing data, and a missing data list, so that the data receiving device respectively creates an attribute of the maximum quantity of missing data, an attribute of the current quantity of missing data, and a missing data list attribute in the time series resource based on the maximum quantity of missing data, the current quantity of missing data, and the missing data list.

The attribute of the maximum quantity of missing data is used to record a maximum quantity of missing time series data, the attribute of the current quantity of missing data is used to record a current quantity of missing time series data, and the missing data list is used to record time information and/or a sequence number of time series data that is already missing.

In the foregoing embodiment, the parameters carried in the first request message further include a maximum waiting time, so that the data receiving device creates a maximum waiting time attribute in the time series resource based on the maximum waiting time. The maximum waiting time attribute is used by the data receiving device to identify a maximum waiting time taken to determine time series data that has not been received as missing time series data.

In the foregoing embodiment, the parameters carried in the first request message further include a trigger parameter of a time series data missing notification, so that the data receiving device sets a missing data subscription event in a subscription resource of the time series resource based on the trigger parameter of a time series data missing notification, and the missing data subscription event includes the trigger condition for a data missing notification that is set based on the trigger parameter of a time series data missing notification.

In the foregoing embodiment, the apparatus for detecting time series data further includes: a second sending module, configured to send, to the data receiving device, a second request message for requesting the data receiving device to create a subscription resource.

The second request message carries a trigger parameter of a time series data missing notification, so that the data receiving device sets a missing data subscription event in the created subscription resource based on the trigger parameter of a time series data missing notification, and the missing data subscription event includes the trigger condition for a data missing notification that is set based on the trigger parameter of a time series data missing notification.

Figure 16:
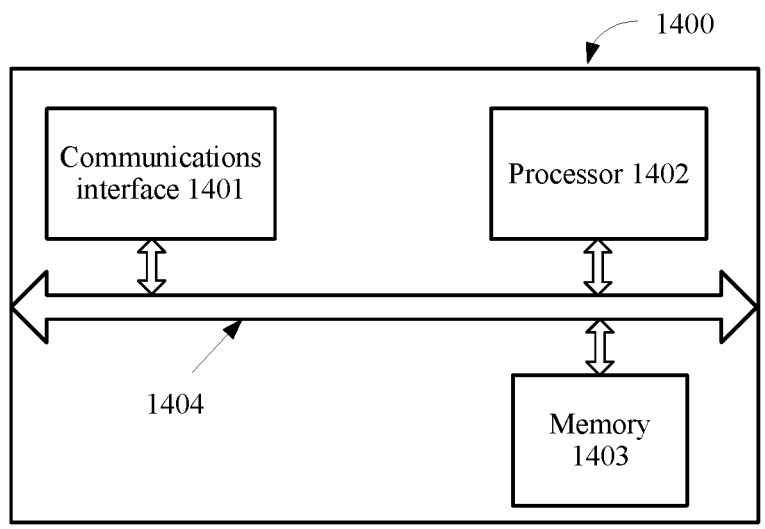
FIG. 16 is a schematic structural diagram of a device for detecting time series data according to an embodiment of the present invention.

FIG. 16 is a schematic structural diagram of a device for detecting time series data according to an embodiment of the present invention. As shown in FIG. 16, the device 1400 for detecting time series data includes a communications interface 1401, a memory 1403, and a processor 1402. The communications interface 1401, the processor 1402, and the memory 1403 are connected to each other by using a bus 1404. The bus 1404 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of denotation, the bus is represented by using only one bold line in FIG. 16, but it does not indicate that there is only one bus or only one type of bus.

The communications interface 1401 is configured to communicate with a transmit end. The memory 1403 is configured to store a program. Specifically, the program may include program code, and the program code includes a computer operation instruction. The memory 1403 may include a random access memory (random access memory, RAM for short), or may further include a non-volatile memory (non-volatile memory), for example, at least one disk memory.

The processor 1402 executes the program stored in the memory 1403, to implement the method in the foregoing method embodiments of the present invention.

The method includes:

determining, based on data information carried in time series data from a data source device, whether missing of time series data occurs in a data receiving process, where the data information includes time information and/or sequence numbers;

if missing of time series data occurs, storing data information of the missing time series data;

determining whether a preset trigger condition for a data missing notification is currently satisfied; and if the trigger condition for a data missing notification is satisfied, sending data missing notification information to a target device.

The processor 1402 may be a general-purpose processor, including a central processing unit (Central Processing Unit, CPU for short), a network processor (Network Processor, NP for short), and the like; or may be a digital signal processor (DSP), an application-specific integrated circuit (ASIC), a field programmable gate array (FPGA), or another programmable logic device, a discrete gate or a transistor logic device, or a discrete hardware component.

The device for detecting time series data in this embodiment determines, based on the data information of the time series data that is already received, whether missing of time series data of data information occurs in the data receiving process, and reports information about the missing time series data to the target device when the trigger condition for a data missing notification is satisfied, so as to implement, in a data transmission system, detection and reporting of the missing time series data.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for detecting time series data, wherein the method is applied to a data transmission system and comprises:

determining, based on data information carried in time series data from a data source device, whether missing of time series data occurs in a data receiving process, wherein the data information comprises at least one of time information or sequence numbers;

in response to determining that missing of time series data occurs, storing data information of missing time series data;

determining whether a missing data subscription event is set in a subscription resource created in advance; and if the missing data subscription event is determined to be set, determining whether a preset trigger condition for a data missing notification that is preset in the missing data subscription event is currently satisfied; and if the preset trigger condition for the data missing notification is satisfied, sending data missing notification information to a target device.

2. The method according to claim 1, before the determining, based on data information carried in time series data from the data source device, whether missing of time series data occurs in the data receiving process, further comprising:

creating a time series resource based on a first request message that is from the data source device and that requests to create the time series resource, wherein the first request message carries the following parameters: a maximum quantity of missing data, a current quantity of missing data, and a missing data list; and the time series resource comprises: an attribute of the maximum quantity of missing data, an attribute of the current quantity of missing data, and a missing data list attribute that are respectively created based on the maximum quantity of missing data, the current quantity of missing data, and the missing data list; and the attribute of the maximum quantity of missing data records a maximum quantity of missing time series data, the attribute of the current quantity of missing data records a current quantity of missing time series data, and the missing data list records at least one of time information or a sequence number of time series data that is already missing.

3. The method according to claim 2, wherein the parameters carried in the first request message further comprise a maximum waiting time; and the time series resource further comprises a maximum waiting time attribute that is created based on the maximum waiting time, wherein the maximum waiting time attribute identifies a maximum waiting time taken to determine time series data that has not been received as missing time series data.

4. The method according to claim 2, wherein the parameters carried in the first request message further comprise a trigger parameter of a time series data missing notification;

the time series resource further comprises a subscription resource, and the subscription resource comprises a missing data subscription event that is set based on the trigger parameter of the time series data missing notification; and the missing data subscription event comprises the preset trigger condition for the data missing notification that is set based on the trigger parameter of the time series data missing notification.

5. The method according to claim 2, wherein the method further comprises:

creating a subscription resource based on a second request message that is from the data source device and that requests to create a subscription resource, wherein the subscription resource is a child resource of the time series resource, and the second request message carries a trigger parameter of a time series data missing notification;

the subscription resource comprises a missing data subscription event that is set based on the trigger parameter of the time series data missing notification; and the missing data subscription event comprises the preset trigger condition for the data missing notification that is set based on the trigger parameter of the time series data missing notification.

6. The method according to claim 1, wherein the preset trigger condition for the data missing notification comprises at least one of the following:

whether a current time reaches a report time predetermined in a preset missing data report period; or whether a current quantity of time series data that is already missing reaches a preset report quantity.

7. The method according to claim 1, before the determining, based on data information carried in time series data from the data source device, whether missing of time series data occurs in the data receiving process, further comprising:

determining whether a value of a missing data detection parameter in a time series resource created in advance is true; and if the value is true, determining, based on the data information carried in the time series data from the data source device, whether missing of time series data occurs in the data receiving process.

8. A method for detecting time series data, wherein the method is applied to a data transmission system and comprises:

generating time series data based on data information of data to be sent, wherein the time series data carries the data information, and the data information comprises at least one of time information or sequence numbers; and sending the time series data to a data receiving device, wherein the data receiving device determines, based on the at least one of time information or sequence numbers carried in received time series data, whether missing of time series data occurs in a data receiving process, and in response to determining that missing of time series data occurs, the data receiving device stores data information of missing time series data and determines whether a missing data subscription event is set in a subscription resource created in advance; and if the missing data subscription event is determined to be set, the data receiving device determines whether a preset trigger condition for a data missing notification that is preset in the missing data subscription event is currently satisfied, and if the preset trigger condition for the data missing notification is satisfied, the data receiving device sends data missing notification information to a target device.

9. The method according to claim 8, before the sending the time series data to the data receiving device, further comprising:

sending, to the data receiving device, a first request message for requesting the data receiving device to create a time series resource, wherein the first request message carries the following parameters: a maximum quantity of missing data, a current quantity of missing data, and a missing data list, wherein the data receiving device respectively creates an attribute of the maximum quantity of missing data, an attribute of the current quantity of missing data, and a missing data list attribute in the time series resource based on the maximum quantity of missing data, the current quantity of missing data, and the missing data list; and the attribute of the maximum quantity of missing data records a maximum quantity of missing time series data, the attribute of the current quantity of missing data records a current quantity of missing time series data, and the missing data list records at least one of time information or a sequence number of time series data that is already missing.

10. The method according to claim 9, wherein the parameters carried in the first request message further comprise a maximum waiting time, wherein the data receiving device creates a maximum waiting time attribute in the time series resource based on the maximum waiting time, wherein the maximum waiting time attribute identifies a maximum waiting time taken to determine time series data that has not been received as missing time series data.

11. The method according to claim 9, wherein the parameters carried in the first request message further comprise a trigger parameter of a time series data missing notification, wherein the data receiving device sets a missing data subscription event in a subscription resource of the time series resource based on the trigger parameter of the time series data missing notification, and the missing data subscription event comprises the preset trigger condition for the data missing notification that is set based on the trigger parameter of the time series data missing notification.

12. The method according to claim 9, wherein the method further comprises:
    sending, to the data receiving device, a second request message for requesting the data receiving device to create a subscription resource, wherein
    the second request message carries a trigger parameter of a time series data missing notification, wherein the data receiving device sets a missing data subscription event in the created subscription resource based on the trigger parameter of the time series data missing notification, and the missing data subscription event comprises the preset trigger condition for the data missing notification that is set based on the trigger parameter of the time series data missing notification.

13. An apparatus for detecting time series data, wherein the apparatus operates in a data transmission system and the apparatus comprises:
    a non-transitory memory storage comprising instructions;
    one or more hardware processors in communication with the memory storage, wherein the one or more hardware processors execute the instructions to:
        determine, based on data information carried in time series data from a data source device, whether missing of time series data occurs in a data receiving process, wherein the data information comprises at least one of time information or sequence numbers;
        in response to determining that missing of time series data occurs, store data information of missing time series data;
        determine whether a missing data subscription event is set in a subscription resource created in advance; and
        if the missing data subscription event is determined to be set, determine whether a preset trigger condition for the data missing notification that is preset in the missing data subscription event is currently satisfied; and
    a transmitter configured to: if the preset trigger condition for the data missing notification is satisfied, send data missing notification information to a target device.

14. The apparatus according to claim 13, wherein the one or more hardware processors execute the instructions to:
before whether missing of time series data occurs in the data receiving process is determined based on the data information carried in the time series data from the data source device, create a time series resource based on a first request message that is from the data source device and that requests to create the time series resource, wherein
    the first request message carries the following parameters: a maximum quantity of missing data, a current quantity of missing data, and a missing data list; and the time series resource comprises: an attribute of the maximum quantity of missing data, an attribute of the current quantity of missing data, and a missing data list attribute that are respectively created based on the maximum quantity of missing data, the current quantity of missing data, and the missing data list; and
    the attribute of the maximum quantity of missing data records a maximum quantity of missing time series data, the attribute of the current quantity of missing data records a current quantity of missing time series data, and the missing data list records at least one of time information or a sequence number of time series data that is already missing.

15. The apparatus according to claim 14, wherein the parameters carried in the first request message further comprise a maximum waiting time; and
    the time series resource further comprises a maximum waiting time attribute that is created based on the maximum waiting time, wherein the maximum waiting time attribute identifies a maximum waiting time taken to determine time series data that has not been received as missing time series data.

16. The apparatus according to claim 14, wherein the parameters carried in the first request message further comprise a trigger parameter of a time series data missing notification;
    the time series resource further comprises a subscription resource, and the subscription resource comprises a missing data subscription event that is set based on the trigger parameter of the time series data missing notification; and
    the missing data subscription event comprises the preset trigger condition for the data missing notification that is set based on the trigger parameter of the time series data missing notification.

17. The apparatus according to claim 14, wherein the one or more hardware processors execute the instructions to:
    create a subscription resource based on a second request message that is from the data source device and requests to create a subscription resource, wherein
    the subscription resource is a child resource of the time series resource, and the second request message carries a trigger parameter of a time series data missing notification;
    the subscription resource comprises a missing data subscription event that is set based on the trigger parameter of the time series data missing notification; and
    the missing data subscription event comprises the preset trigger condition for the data missing notification that is set based on the trigger parameter of the time series data missing notification.

18. The apparatus according to claim 13, wherein the preset trigger condition for the data missing notification comprises at least one of the following:
    whether a current time reaches a report time predetermined in a preset missing data report period; or
    whether a current quantity of time series data that is already missing reaches a preset report quantity.

19. The apparatus according to claim 13, wherein before determining, based on the data information carried in the time series data from the data source device, whether missing of time series data occurs in the data receiving process, the one or more hardware processors execute the instructions to:
  determine whether a value of a missing data detection parameter in a time series resource created in advance is true; and
  if the value is true, determine, based on the data information carried in the time series data from the data source device, whether missing of time series data occurs in the data receiving process.

20. An apparatus for detecting time series data, wherein the apparatus operates in a data transmission system and comprises:
  a non-transitory memory storage comprising instructions;
  one or more hardware processors in communication with the memory storage, wherein the one or more hardware processors execute the instructions to:
    generate time series data based on data information of data to be sent, wherein the time series data carries the data information, and the data information comprises at least one of time information or sequence numbers; and
  a transmitter configured to send the time series data to a data receiving device, wherein the data receiving device determines, based on the at least one of time information or sequence numbers carried in received time series data, whether missing of time series data occurs in a data receiving process, and in response to determining that missing of time series data occurs, the data receiving device stores data information of missing time series data; the data receiving device determines whether a missing data subscription event is set in a subscription resource created in advance; and if the missing data subscription event is determined to be set, the data receiving device further determines whether a preset trigger condition for a data missing notification that is preset in the missing data subscription event is currently satisfied, and if the preset trigger condition for the data missing notification is satisfied, the data receiving device sends data missing notification information to a target device.

21. The apparatus according to claim 20, wherein the transmitter is further configured to: before sending the time series data to the data receiving device, send, to the data receiving device, a first request message for requesting the data receiving device to create a time series resource, wherein the first request message carries the following parameters: a maximum quantity of missing data, a current quantity of missing data, and a missing data list, wherein the data receiving device respectively creates an attribute of the maximum quantity of missing data, an attribute of the current quantity of missing data, and a missing data list attribute in the time series resource based on the maximum quantity of missing data, the current quantity of missing data, and the missing data list; and
the attribute of the maximum quantity of missing data records a maximum quantity of missing time series data, the attribute of the current quantity of missing data records a current quantity of missing time series data, and the missing data list records at least one of time information or a sequence number of time series data that is already missing.

22. The apparatus according to claim 21, wherein the parameters carried in the first request message further comprise a maximum waiting time, wherein the data receiving device creates a maximum waiting time attribute in the time series resource based on the maximum waiting time, wherein the maximum waiting time attribute identifies a maximum waiting time taken to determine time series data that has not been received as missing time series data.

23. The apparatus according to claim 21, wherein the parameters carried in the first request message further comprise a trigger parameter of a time series data missing notification, wherein the data receiving device sets a missing data subscription event in a subscription resource of the time series resource based on the trigger parameter of the time series data missing notification, and the missing data subscription event comprises the preset trigger condition for the data missing notification that is set based on the trigger parameter of the time series data missing notification.

24. The apparatus according to claim 21, wherein the transmitter is further configured to send, to the data receiving device, a second request message for requesting the data receiving device to create a subscription resource, wherein the second request message carries a trigger parameter of a time series data missing notification, wherein the data receiving device sets a missing data subscription event in the created subscription resource based on the trigger parameter of the time series data missing notification, and the missing data subscription event comprises the preset trigger condition for the data missing notification that is set based on the trigger parameter of the time series data missing notification.

* * * * *